(12) United States Patent  
Odani et al.

(10) Patent No.: US 10,680,286 B2  
(45) Date of Patent: Jun. 9, 2020

(54) NONAQUEOUS ELECTROLYTE BATTERY

(71) Applicant: Murata Manufacturing Co., Ltd., Kyoto (JP)

(72) Inventors: Toru Odani, Fukushima (JP); Akira Yamaguchi, Fukushima (JP); Masahiro Miyamoto, Fukushima (JP); Tadahiko Kubota, Kanagawa (JP)

(73) Assignee: Murata Manufacturing Co., Ltd., Kyoto (JP)

(*) Notice: Subject to any disclaimer, the term of this patent is extended or adjusted under 35 U.S.C. 154(b) by 61 days.

(21) Appl. No.: 15/653,708

(22) Filed: Jul. 19, 2017

(65) Prior Publication Data

US 2018/0006331 A1 Jan. 4, 2018

Related U.S. Application Data

(63) Continuation of application No. 13/011,067, filed on Jan. 21, 2011, now Pat. No. 9,742,037.

(30) Foreign Application Priority Data

Jan. 28, 2010 (JP) ................................. 2010-017062

(51) Int. Cl.
*H01M 4/02* (2006.01)
*H01M 10/0569* (2010.01)
(Continued)

(52) U.S. Cl.
CPC ....... *H01M 10/0569* (2013.01); *H01M 4/131* (2013.01); *H01M 4/366* (2013.01);
(Continued)

(58) Field of Classification Search
CPC ..................................................... H01M 4/02
See application file for complete search history.

(56) References Cited

U.S. PATENT DOCUMENTS

2007/0026315 A1 2/2007 Lampe-Onnerud
2008/0241670 A1 10/2008 Kim et al.
(Continued)

FOREIGN PATENT DOCUMENTS

JP  10-275632    10/1998
JP  2001-167791   6/2001
(Continued)

OTHER PUBLICATIONS

Chinese Office Action dated Apr. 2, 2014 in corresponding Chinese Patent Application No. 201110024478.4.

*Primary Examiner* — Jacob B Marks  
(74) *Attorney, Agent, or Firm* — K&L Gates LLP

(57) ABSTRACT

A nonaqueous electrolyte battery includes: a positive electrode, a negative electrode, and a nonaqueous electrolyte, wherein the positive electrode contains, as a positive electrode active material, a positive electrode material having a surface composition represented by the following formula (I); the nonaqueous electrolyte contains a halogenated carbonate represented by any of the following formulae (1) to (2) and an alkylbenzene represented by the following formula (3); a content of the halogenated carbonate is 0.1% by mass or more and not more than 50% by mass relative to the nonaqueous electrolyte; and a content of the alkylbenzene is 0.1% by mass or more and not more than 5% by mass relative to the nonaqueous electrolyte $$Li_pNi_{(1-q-r)}M1_qM2_rO_{(2-y)}X_z \qquad (I)$$

(1)

(Continued)

-continued

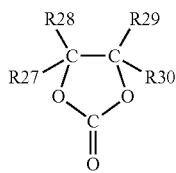

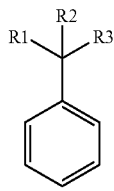

11 Claims, 4 Drawing Sheets

(51) Int. Cl.
- *H01M 4/131* (2010.01)
- *H01M 4/36* (2006.01)
- *H01M 4/525* (2010.01)
- *H01M 10/0525* (2010.01)
- *H01M 10/0567* (2010.01)

(52) U.S. Cl.
CPC ....... *H01M 4/525* (2013.01); *H01M 10/0525* (2013.01); *H01M 10/0567* (2013.01); *H01M 2300/004* (2013.01); *Y02E 60/122* (2013.01)

(56) References Cited

U.S. PATENT DOCUMENTS

| | | | |
|---|---|---|---|
| 2008/0254367 A1 | 10/2008 | Hamamoto et al. | |
| 2008/0280210 A1 | 11/2008 | Kawashima | |
| 2009/0117465 A1* | 5/2009 | Tokunaga | H01M 4/366 429/223 |
| 2009/0263726 A1* | 10/2009 | Yamaguchi | C07D 317/18 429/324 |
| 2009/0325065 A1 | 12/2009 | Fujii | |
| 2010/0035146 A1* | 2/2010 | Fujii | H01M 10/0525 429/200 |
| 2011/0250504 A1* | 10/2011 | Hamamoto | H01M 4/382 429/332 |

FOREIGN PATENT DOCUMENTS

| | | |
|---|---|---|
| JP | 2002-298909 | 10/2002 |
| JP | 2005-038629 * | 2/2005 |
| JP | 2006-309965 | 11/2006 |
| JP | 2008-186792 | 8/2008 |
| KR | 2008-049546 | 6/2008 |

* cited by examiner

NONAQUEOUS ELECTROLYTE BATTERY

CROSS REFERENCES TO RELATED APPLICATIONS

The present application is a continuation of U.S. patent application Ser. No. 13/011,067, filed on Jan. 21, 2011, which application claims priority to Japanese Priority Patent Application JP 2010-017062 filed in the Japan Patent Office on Jan. 28, 2010, the entire contents of which is hereby incorporated by reference.

BACKGROUND

The present application relates to a nonaqueous electrolyte battery. In more detail, the present application relates to a nonaqueous electrolyte battery using a nonaqueous electrolyte containing an organic solvent and an electrolyte salt.

In recent years, portable electronic appliances such as a camera-integrated VTR (video tape recorder), a mobile phone and a laptop PC (personal computer) have widely spread, and it is strongly demanded to realize downsizing, weight reduction and long life thereof. Following this, the development of batteries as a power source of portable electronic appliances, in particular, secondary batteries such as lithium ion secondary batteries which are lightweight and which are able to obtain a high energy density is advanced.

In the field of such a lithium ion secondary battery, the research for enhancing battery characteristics such as cycle characteristics and a battery capacity is energetically conducted, and various technologies for enhancing the battery characteristics and battery capacity have been proposed.

For example, JP-A-10-275632 discloses a technology for enhancing safety by allowing an electrolytic solution to contain an alkyl group-containing nonionic aromatic hydrocarbon compound.

JP-A-2001-167791 and JP-A-2002-298909 disclose technologies for enhancing battery characteristics by allowing an electrolytic solution to contain a tert-butylbenzene derivative.

JP-A-2006-309965 discloses a technology for enhancing battery characteristics by allowing an electrolytic solution to contain tert-pentylbenzene and 4-fluoro-1,3-dioxolan-2-one.

JP-A-2008-186792 discloses that lithium carbonate to be contained in a positive electrode is decomposed at the beginning of overcharge to generate a gas, and a pressure-sensitive safety mechanism is actuated in an early stage, thereby enhancing safety. Also, JP-A-2008-186792 discloses that a cycloalkylbenzene compound and/or a compound having quaternary carbon adjacent to a benzene ring acts so as to suppress a lowering of high temperature cycle characteristics by the addition of lithium carbonate, whereby the high temperature cycle characteristics are tremendously enhanced.

Also, in order to contrive to attain a higher capacity of a lithium ion secondary battery, it is proposed to use, as a positive electrode active material, lithium nickelate (LiNiO$_2$) or a nickel based lithium complex oxide obtained by substituting a part of nickel of lithium nickelate with other metal.

SUMMARY

However, when lithium nickelate or a nickel based lithium complex oxide is used for the positive electrode active material, the generation of a gas is accelerated in the inside of the battery at the time of high temperature storage. According to this, for example, in a cylinder type lithium ion secondary battery equipped with a pressure actuated safety valve, the pressure actuated safety valve is actuated by an increase of an internal pressure of the battery to be caused due to the generation of a gas, so that the battery is no longer useful. Also, in a laminated film type lithium ion secondary battery and a rectangular lithium ion secondary battery, the generation of a gas is accelerated, so that the battery expands.

In consequence, it is desirable to provide a nonaqueous electrolyte battery capable of suppressing the generation of a gas at the time of high temperature storage.

According to an embodiment, there is provided a nonaqueous electrolyte battery including a positive electrode, a negative electrode and a nonaqueous electrolyte, wherein the positive electrode contains a positive electrode material which is granular and which has a surface composition represented by the following formula (I); the nonaqueous electrolyte contains a halogenated carbonate represented by any of the following formulae (1) to (2) and an alkylbenzene represented by the following formula (3); a content of the halogenated carbonate is 0.1% by mass or more and not more than 50% by mass relative to the nonaqueous electrolyte; and a content of the alkylbenzene is 0.1% by mass or more and not more than 5% by mass relative to the nonaqueous electrolyte.

(In the formula (I), each of M1 and M2 represents at least one member selected from the group consisting of elements of the groups 2 to 15 other than nickel (Ni); X represents at least one member selected from the group consisting of elements of the groups 16 and 17 other than oxygen (O); p, q, r, y and z are values falling within the ranges of (0≤p≤1.5), (0≤q≤1.0), (0≤r≤1.0), (−0.10≤y≤0.20) and (0≤z≤0.2), respectively; and (q+r) is less than 1.)

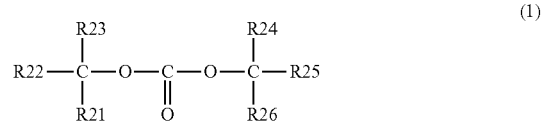

(In the formula (1), each of R21 to R26 independently represents a hydrogen group, a halogen group, an alkyl group or a halogenated alkyl group, provided that at least one of R21 to R26 is a halogen group or a halogenated alkyl group.)

(In the formula (2), each of R27 to R30 independently represents a hydrogen group, a halogen group, an alkyl group or a halogenated alkyl group, provided that at least one of R27 to R30 is a halogen group or a halogenated alkyl group.)

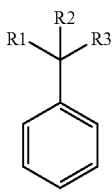

(3)

(In the formula (3), each of R1 to R3 independently represents an alkyl group or an aryl group; R1 to R3 may be bonded to each other to form a ring; and a part of hydrogen in each of R1 to R3 may be substituted with a halogen.)

In this embodiment according to the present application, the nonaqueous electrolyte contains 0.1% by mass or more and not more than 50% by mass of the halogenated carbonate represented by any of the formulae (1) to (2) and 0.1% by mass or more and not more than 5% by mass of the alkylbenzene represented by the formula (3). According to this, the generation of a gas at the time of high temperature storage can be suppressed.

According to the embodiment, the generation of a gas at the time of high temperature storage can be suppressed.

Additional features and advantages are described herein, and will be apparent from the following Detailed Description and the figures.

DETAILED DESCRIPTION

Embodiments of the present application will be described below in detail with reference to the drawings.

1. First Embodiment (Configuration of Battery)

Figure 1:
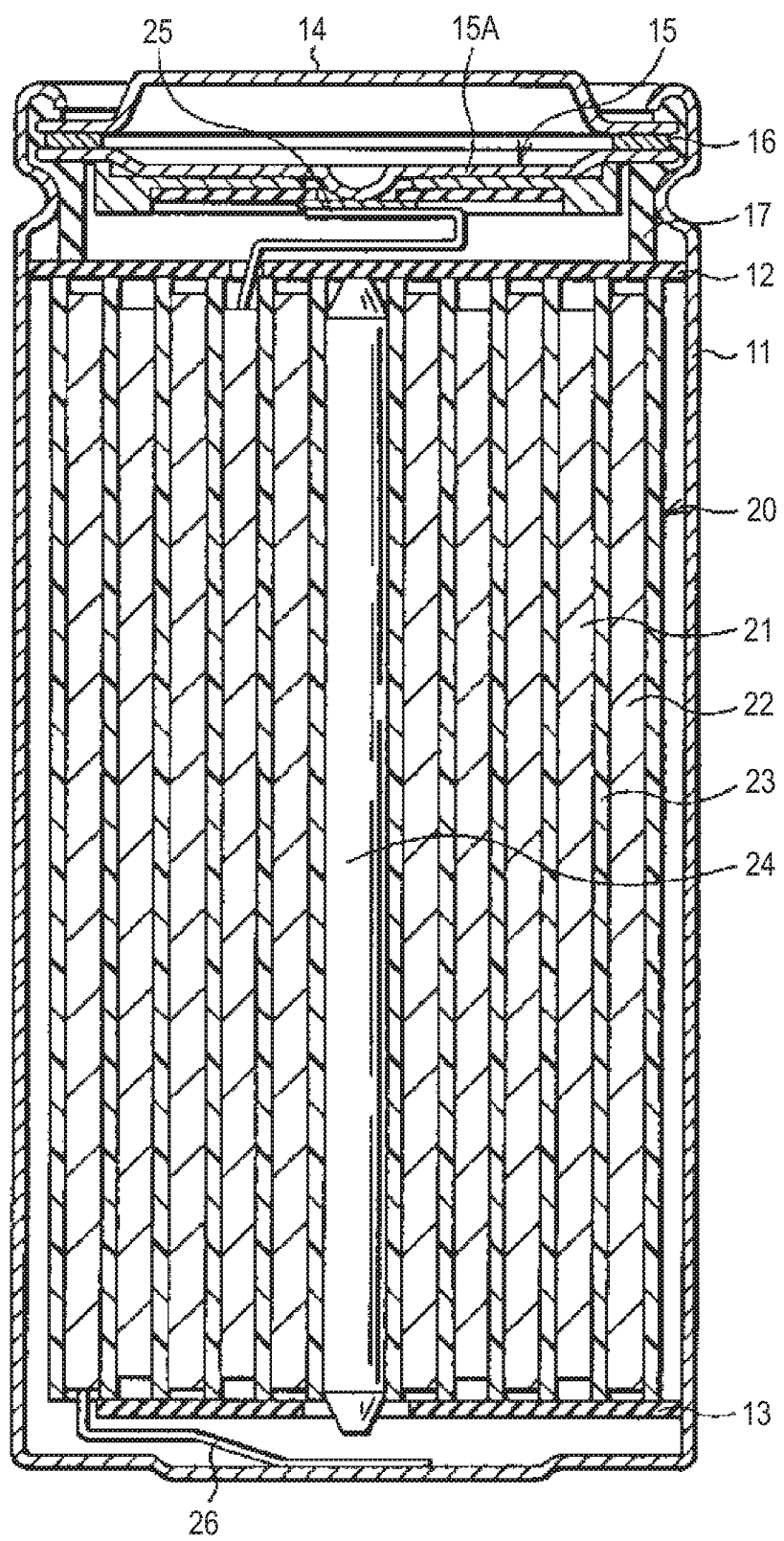
FIG. 1 is a sectional view showing a configuration example of a nonaqueous electrolyte battery according to an embodiment.
Figure 2:
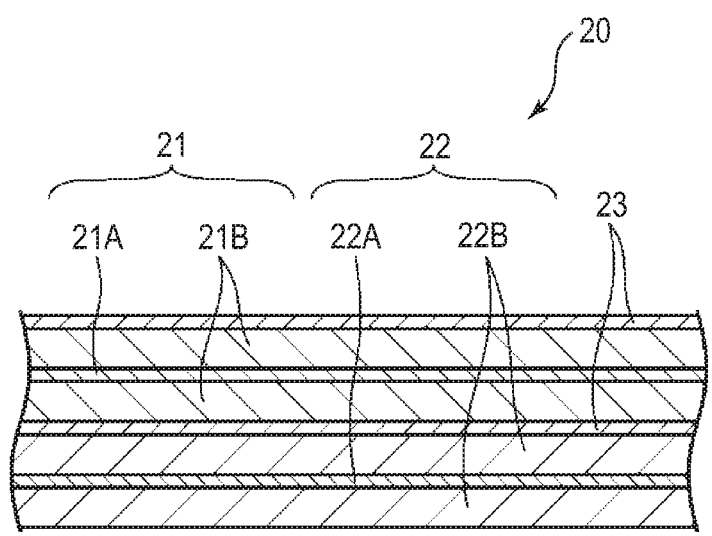
FIG. 2 is a sectional view showing enlargedly a part of a wound electrode body in FIG. 1.

A nonaqueous electrolyte battery according to a first embodiment is described by reference to FIGS. 1 and 2. FIG. 1 shows a sectional configuration of a nonaqueous electrolyte battery according to the first embodiment. FIG. 2 shows enlargedly a part of a wound electrode body 20 shown in FIG. 1. This nonaqueous electrolyte battery is, for example, a nonaqueous electrolyte secondary battery capable of undergoing charge and discharge and is a lithium ion secondary battery in which a capacity of a negative electrode 22 is expressed on the basis of intercalation and deintercalation of lithium which is an electrode reactant.

This nonaqueous electrolyte battery is chiefly a nonaqueous electrolyte battery in which the wound electrode body 20 in which a positive electrode 21 and the negative electrode 22 are laminated via a separator 23 and wound and a pair of insulating plates 12 and 13 are housed in the inside of a battery can 11 having a substantially hollow columnar shape. The battery structure using this columnar battery can 11 is called a cylinder type.

The battery can 11 is, for example, constituted of nickel (Ni)-plated iron (Fe), and one end thereof is closed, with the other end being opened. In the inside of the battery can 11, a pair of insulating plates 12 and 13 is respectively disposed vertical to the winding peripheral face so as to interpose the wound electrode body 20 therebetween.

In the open end of the battery can 11, a battery lid 14 is installed by caulking with a safety valve mechanism 15 and a positive temperature coefficient device (PTC device) 16 provided in the inside of this battery lid 14 via a gasket 17, and the inside of the battery can 11 is hermetically sealed.

The battery lid 14 is, for example, constituted of the same material as that in the battery can 11. The safety valve mechanism 15 is electrically connected to the battery lid 14 via the positive temperature coefficient device 16, and when the internal pressure of the battery reaches a fixed value or more due to an internal short circuit or heating from the outside or the like, a disc plate 15A is reversed, thereby disconnecting electrical connection between the battery lid 14 and the wound electrode body 20.

When the temperature rises, the positive temperature coefficient device 16 controls the current by an increase of the resistance value, thereby preventing abnormal heat generation to be caused due to a large current from occurring. The gasket 17 is, for example, constituted of an insulating material, and asphalt is coated on the surface thereof.

For example, a center pin 24 is inserted into the center of the wound electrode body 20. In the wound electrode body 20, a positive electrode lead 25 made of aluminum (Al) or the like is connected to the positive electrode 21; and a negative electrode lead 26 made of nickel (Ni) or the like is connected to the negative electrode 22. The positive electrode lead 25 is electrically connected to the battery lid 14 by means of welding to the safety valve mechanism 15; and the negative electrode lead 26 is electrically connected to the battery can 11 by means of welding.

(Positive Electrode)

The positive electrode 21 is, for example, a positive electrode in which a positive electrode active material layer 21B is provided on the both surfaces of a positive electrode collector 21A having a pair of surfaces. However, the positive electrode active material layer 21B may be provided on only one surface of the positive electrode collector 21A.

The positive electrode collector 21A is, for example, constituted of a metal material such as aluminum, nickel and stainless steel.

The positive electrode active material layer 21B contains, as a positive electrode active material, one or two or more kinds of a positive electrode material capable of intercalating and deintercalating lithium and may further contain other material such as a binder and a conductive agent, if desired.

(Positive Electrode Material)
(Lithium Nickel Complex Oxide)

As the positive electrode material, for example, a lithium nickel complex oxide which is granular and which contains lithium and nickel is exemplified. This lithium nickel complex oxide has, for example, a layered structure. As this lithium nickel complex oxide, for example, a lithium nickel complex$_{oxide}$ represented by the following formula (I) is exemplified.

$$Li_pNi_{(1-q-r)}M1_qM2_rO_{(2-y)}X_z \qquad (I)$$

(In the formula (I), each of M1 and M2 represents at least one member selected from the group consisting of elements of the groups 2 to 15 other than nickel (Ni); X represents at least one member selected from the group consisting of elements of the groups 16 and 17 other than oxygen (O); p, q, r, y and z are values falling within the ranges of ($0 \leq p \leq 1.5$), ($0 \leq q \leq 1.0$), ($0 \leq r \leq 1.0$), ($-0.10 \leq y \leq 0.20$) and ($0 \leq z \leq 0.2$), respectively; and (q+r) is less than 1.)

Specific examples of the lithium nickel complex oxide represented by the formula (I) include $Li_pNiO_2$, $Li_pNi_{1-q-r}Co_qMn_rO_2$ and $Li_pNi_{1-q-r}CoqAlrO2$.

Of the lithium nickel complex oxides, a lithium nickel complex oxide with a high nickel content is preferable from the standpoint of realizing a high capacity. The lithium nickel complex oxide with a high nickel content as referred to herein means, for example, a lithium nickel complex oxide in which among metal elements (exclusive of lithium) constituting the lithium nickel complex oxide, a nickel component is contained in an amount of 50% or more in terms of a molar fraction.

Examples of the lithium nickel complex oxide with a high nickel content include a lithium nickel complex oxide represented by the following formula (II).

$$Li_pNi_{(1-q-r)}M1_qM2_rO_{(2-y)}X_z \quad (II)$$

(In the formula (II), each of M1 and M2 represents at least one member selected from the group consisting of elements of the groups 2 to 15 other than nickel (Ni); X represents at least one member selected from the group consisting of elements of the groups 16 and 17 other than oxygen (O); p, q, r, y and z are values falling within the ranges of ($0 \leq p \leq 1.5$), ($0 \leq q \leq 1.0$), ($0 \leq r \leq 1.0$), ($-0.10 \leq y \leq 0.20$) and ($0 \leq z \leq 0.2$), respectively; and (q+r) is not more than 0.5.)

In addition to the foregoing lithium nickel complex oxide, as the positive electrode material, other lithium complex oxide which is capable of intercalating and deintercalating lithium and which is granular is exemplified. This material may be used as the positive electrode active material together with the foregoing lithium nickel complex oxide.

(Other Lithium Complex Oxide)

Examples of other lithium complex oxide include lithium cobaltate having a layered structure ($LiCoO_2$); a cobalt based lithium complex oxide containing a metal element other than cobalt disposed in place of at least a part of cobalt in lithium cobaltate; and a lithium manganese complex oxide having a spinel type structure (for example, $LiMn_2O_4$, etc.).

(Mixing Ratio)

In the case of using other lithium complex oxide together with the foregoing lithium nickel complex oxide, from the standpoint of realizing a high capacity, a content of the lithium nickel complex oxide is preferably 50% by mass or more, and more preferably 70% by mass or more on the basis of a total mass of the positive electrode active material.

(Coated Positive Electrode Material)

As the positive electrode material, a positive electrode material in which a coating layer containing an oxide having lithium (Li), nickel (Ni) and manganese (Mn) in at least a part of the surface of a lithium complex oxide particle serving as a matrix particle (hereinafter properly referred to as "coated positive electrode material") is exemplified.

(Matrix Particle)

The lithium complex oxide particle serving as a matrix particle is not particularly limited so far as it is a lithium complex oxide particle containing lithium and at least one kind of a transition metal and is capable of intercalating and deintercalating lithium. Specific examples thereof include particles of a lithium complex cobalt having a layered structure, such as lithium cobaltate ($LiCoO_2$); a cobalt based lithium complex oxide containing a transition metal element other than cobalt disposed in place of at least a part of cobalt in lithium cobaltate; lithium nickelate ($LiNiO_2$); and a nickel based lithium complex oxide containing a transition metal element other than nickel disposed in place of at least a part of nickel in lithium nickelate.

(Coating Layer)

The coating layer is a layer having different constituent elements or composition ratio from those of the matrix particle and coating at least a part of the surface of the matrix particle. This coating layer includes the foregoing oxides containing lithium (Li), nickel (Ni) and manganese (Mn). By providing this coating layer, the chemical stability can be more enhanced.

The coating layer as referred to herein means a region where when a concentration change of the constituent elements of the lithium complex oxide particle having the coating layer provided thereon from the surface toward the inside is examined, the concentration change is not substantially found. The concentration change of nickel and manganese from the surface toward the inside on the lithium complex oxide particle having the coating layer provided thereon can be, for example, known by measuring the composition while shaving the lithium complex oxide particle having the coating layer provided thereon by means of auger electron spectroscopy (AES) or SIMS (secondary ion mass spectrometry). Also, the concentration change can be known by slowly dissolving the lithium complex oxide particle having the coating layer provided thereon in an acidic solution or the like and measuring a time change of its eluted component by means of an inductively coupled plasma (ICP) spectral analysis or the like.

A composition ratio of nickel (Ni) and manganese (Mn) in the coating layer preferably falls within the range of from 95/5 to 20/80 in terms of a molar ratio of nickel (Ni) to manganese (Mn). This is because when the amount of manganese (Mn) is too large, the intercalation amount of lithium (Li) in the coating layer is lowered, the capacity is lowered, and the electrical resistance increases, whereas when the amount of manganese (Mn) is too small, it may be impossible to sufficiently enhance the charge/discharge efficiency.

In the oxide contained in the coating layer, at least one member selected from the group consisting of magnesium (Mg), aluminum (Al), boron (B), titanium (Ti), vanadium (V), chromium (Cr), iron (Fe), cobalt (Co), copper (Cu), zinc (Zn), molybdenum (Mo), tin (Sn), tungsten (W), zirconium (Zr), yttrium (Y), niobium (Nb), calcium (Ca) and strontium (Sr) may be contained as a constituent element. This is because not only the stability of the positive electrode material can be more enhanced, but the diffusibility of a lithium ion can be more enhanced.

The oxide contained in the coating layer has, for example, a composition represented by the following formula (III).

$$Li_pNi_{(1-q-r)}Mn_qM3_rO_{(2-y)}X_z \quad (III)$$

(In the formula (III), M3 represents at least one member selected from the group consisting of elements of the groups 2 to 15 other than nickel (Ni) and manganese (Mn); X represents at least one member selected from the group consisting of elements of the groups 16 and 17 other than oxygen (O); p, q, r, y and z are values falling within the ranges of ($0 \leq p \leq 1.5$), ($0 \leq q \leq 1.0$), ($0 \leq r \leq 1.0$), ($-0.10 \leq y \leq 0.20$) and ($0 \leq z \leq 0.2$), respectively; and (q+r) is less than 1.)

It is preferable that an amount of the coating layer is 2% by mass or more and not more than 30% by mass relative to the mass of the lithium complex oxide particle. This is because when the amount of the coating layer is too large, the characteristics of the matrix particle are lost, whereas when it is too small, it may be impossible to sufficiently enhance the stability.

(Binder)

Examples of the binder include synthetic rubbers such as a styrene butadiene based rubber, a fluorocarbon based rubber and ethylene propylene diene; and polymer materials such as polyvinylidene fluoride. These materials may be used singly or in admixture of plural kinds thereof.

(Conductive Agent)

Examples of the conductive agent include carbon materials such as graphite and carbon black. These materials may be used singly or in admixture of plural kinds thereof. The conductive agent may be a metal material, a conductive polymer or the like so far as it is a material having conductivity.

(Negative Electrode)

The negative electrode 22 is, for example, a negative electrode in which a negative electrode active material layer 22B is provided on the both surfaces of a negative electrode collector 22A having a pair of surfaces. However, the negative electrode active material layer 22B may be provided on only one surface of the negative electrode collector 22A.

The negative electrode collector 22A is, for example, constituted of a metal material such as copper, nickel and stainless steel.

The negative electrode active material layer 22B contains, as a negative electrode active material, one or two or more kinds of a negative electrode material capable of intercalating and deintercalating lithium and may further contain other materials such as a binder and a conductive agent, if desired. As the binder and the conductive agent, the same materials as those described above with respect to the positive electrode 21 can be used, respectively.

Examples of the negative electrode material capable of intercalating and deintercalating lithium include carbon materials. Examples of such a carbon material include hardly graphitized carbon, easily graphitized carbon, artificial graphite such as MCMB (mesocarbon microbead), natural graphite, pyrolytic carbons, cokes, graphites, vitreous carbons, organic polymer compound baked materials, carbon blacks, carbon fibers and active carbon. Of these, examples of the cokes include pitch coke, needle coke and petroleum coke. The organic polymer compound baked material as referred to herein is a material obtained through carbonization by baking a polymer material such as a phenol resin and a furan resin at an appropriate temperature, and a part thereof is classified into hardly graphitized carbon or easily graphitized carbon.

In addition to the foregoing carbon materials, examples of the negative electrode material capable of intercalating and deintercalating lithium include a material capable of intercalating and deintercalating lithium and containing, as a constituent element, at least one member selected from the group consisting of metal elements and semi-metal elements. This is because a high energy density is obtainable. Such a negative electrode material may be a simple substance, alloy or compound of a metal element or a semi-metal element, and may be a material having one or two or more kinds of such a phase in at least a part thereof may be used. The "alloy" as referred to herein includes, in addition to those composed of two or more kinds of a metal element, those containing one or more kinds of a metal element and one or more kinds of a semi-metal element. Also, the "alloy" may contain a non-metal element. Examples of its texture include a solid solution, a eutectic (eutectic mixture), an intermetallic compound and a texture in which two or more kinds thereof coexist.

Examples of the metal element or semi-metal element include a metal element or a semi-metal element capable of forming an alloy together with lithium. Specific examples thereof include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd) and platinum (Pt). Of these, at least one member selected from group consisting of silicon and tin is preferable, and silicon is more preferable. This is because such a material has large capability of intercalating and deintercalating lithium, so that a high energy density is obtainable.

Examples of the negative electrode material containing at least one member selected from the group consisting of silicon and tin include a simple substance, alloy or compound of silicon; a simple substance, alloy or compound of tin; and a material having one or two or more kinds of such a phase in at least a part thereof.

Examples of alloys of silicon include alloys containing, as a second constituent element other than silicon, at least one member selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr). Examples of alloys of tin include alloys containing, as a second constituent element other than tin, at least one member selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr).

Examples of compounds of tin or compounds of silicon include compounds containing oxygen (O) or carbon (C), and these compounds may contain the foregoing second constituent element in addition to tin (Sn) or silicon (Si).

As the negative electrode material containing at least one member selected from the group consisting of silicon (Si) and tin (Sn), for example, a material containing tin (Sn) as a first constituent element and in addition to this tin (Sn), a second constituent element and a third constituent element is especially preferable. As a matter of course, this negative electrode material may be used together with the foregoing negative electrode material. The second constituent element is at least one member selected from the group consisting of cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cerium (Ce), hafnium (Hf), tantalum (Ta), tungsten (W), bismuth (Bi) and silicon (Si). The third constituent element is at least one member selected from the group consisting of boron (B), carbon (C), aluminum (Al) and phosphorus (P). This is because when the negative electrode material contains the second constituent element and the third constituent element, the cycle characteristics are enhanced.

Above all, the negative electrode material is preferably an SnCoC-containing material containing tin (Sn), cobalt (Co) and carbon (C) as constituent elements and having a content of carbon (C) in the range of 9.9% by mass or more and not more than 29.7% by mass and a proportion of cobalt (Co) to a total sum of tin (Sn) and cobalt (Co) (Co/(Sn+Co))

in the range of 30% by mass or more and not more than 70% by mass. This is because in the foregoing composition range, not only a high energy density is obtainable, but excellent cycle characteristics are obtainable.

This SnCoC-containing material may further contain other constituent element, if desired. As the other constituent element, for example, silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga) and bismuth (Bi) are preferable. The SnCoC-containing material may contain two or more kinds of these elements. This is because the capacity characteristics or cycle characteristics are more enhanced.

The SnCoC-containing material has a phase containing tin (Sn), cobalt (Co) and carbon (C), and this phase preferably has a lowly crystalline or amorphous structure. Also, in the SnCoC-containing material, it is preferable that at least a part of carbon as the constituent element is bound to a metal element or a semi-metal element as other constituent element. This is because though it may be considered that a lowering of the cycle characteristics is caused due to aggregation or crystallization of tin (Sn) or the like, when carbon is bound to other element, such aggregation or crystallization is suppressed.

Examples of a measurement method for examining the binding state of elements include X-ray photoelectron spectroscopy (XPS). In this XPS, so far as graphite is concerned, a peak of the 1s orbit (C1s) of carbon appears at 284.5 eV in an energy-calibrated apparatus such that a peak of the 4f orbit of a gold atom (Au4f) is obtained at 84.0 eV. Also, so far as surface contamination carbon is concerned, a peak of the 1s orbit (C1s) of carbon appears at 284.8 eV. On the contrary, in the case where a charge density of the carbon element is high, for example, in the case where carbon is bound to a metal element or a semi-metal element, the peak of C1s appears in a lower region than 284.5 eV. That is, in the case where a peak of a combined wave of C1s obtained regarding the SnCoC-containing material appears in a lower region than 284.5 eV, at least a part of carbon (C) contained in the SnCoC-containing material is bound to a metal element or a semi-metal element as the other constituent element.

In the XPS measurement, for example, the peak of C1s is used for correcting the energy axis of a spectrum. In general, since surface contamination carbon exists on the surface, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of carbon in the SnCoC-containing material, the peak of the surface contamination carbon and the peak of the carbon in the SnCoC-containing material are separated from each other by means of analysis using, for example, a commercially available software. In the analysis of the waveform, the position of a main peak existing on the side of the lowest binding energy is used as an energy reference (284.8 eV).

Also, examples of the negative electrode material capable of intercalating and deintercalating lithium include metal oxides and polymer compounds, each of which is capable of intercalating and deintercalating lithium. Examples of the metal oxide include iron oxide, ruthenium oxide and molybdenum oxide; and examples of the polymer compound include polyacetylene, polyaniline and polypyrrole.

The negative electrode material capable of intercalating and deintercalating lithium may be other material than those described above. Also, the foregoing negative electrode material may be a mixture of two or more kinds thereof in an arbitrary combination.

The negative electrode active material layer 22B may be, for example, formed by any of a vapor phase method, a liquid phase method, a spraying method, a baking method or a coating method, or a combined method of two or more kinds of these methods. In the case where the negative electrode active material layer 22B is formed by adopting a vapor phase method, a liquid phase method, a spraying method, a baking method or a combined method of two or more kinds of these methods, it is preferable that the negative electrode active material layer 22B and the negative electrode collector 22A are alloyed on at least a part of an interface therebetween. Specifically, it is preferable that on the interface, the constituent elements of the negative electrode collector 22A are diffused into the negative electrode active material layer 22B, the constituent elements of the negative electrode active material layer 22B are diffused into the negative electrode collector 22A, or these constituent elements are mutually diffused into each other. This is because not only breakage to be caused due to expansion and shrinkage of the negative electrode active material layer 22B following the charge/discharge can be suppressed, but the electron conductivity between the negative electrode active material layer 22B and the negative electrode collector 22A can be enhanced.

Examples of the vapor phase method include a physical deposition method and a chemical deposition method, specifically a vacuum vapor deposition method, a sputtering method, an ion plating method, a laser abrasion method, a thermal chemical vapor deposition (CVD) method and a plasma chemical vapor deposition method. As the liquid phase method, known techniques such as electrolytic plating and electroless plating can be adopted. The baking method as referred to herein is, for example, a method in which after a granular negative electrode active material is mixed with a binder and the like, the mixture is dispersed in a solvent and coated, and the coated material is then heat treated at a higher temperature than a melting point of the binder and the like. As to the baking method, known techniques can be utilized, too, and examples thereof include an atmospheric baking method, a reaction baking method and a hot press baking method.

(Separator)

The separator 23 partitions the positive electrode 21 and the negative electrode 22 from each other and allows a lithium ion to pass therethrough while preventing a short circuit of the current to be caused due to the contact between the both electrodes from occurring. This separator 23 is, for example, constituted of a porous film made of a synthetic resin such as polytetrafluoroethylene, polypropylene and polyethylene, a porous film made of a ceramic or the like. The separator 23 may be a laminate of two or more kinds of such a porous film. The separator 23 is impregnated with an electrolytic solution.

(Electrolytic Solution)

The electrolytic solution contains a solvent and an electrolyte salt dissolved in this solvent.

(Solvent)

The solvent contains a halogenated carbonate represented by any of the following formulae (1) to (2) and an alkylbenzene represented by the following formula (3).

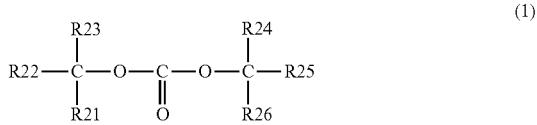

(In the formula (1), each of R21 to R26 independently represents a hydrogen group, a halogen group, an alkyl group or a halogenated alkyl group, provided that at least one of R21 to R26 is a halogen group or a halogenated alkyl group.)

(In the formula (2), each of R27 to R30 independently represents a hydrogen group, a halogen group, an alkyl group or a halogenated alkyl group, provided that at least one of R27 to R30 is a halogen group or a halogenated alkyl group.)

(In the formula (3), each of R1 to R3 independently represents an alkyl group or an aryl group; R1 to R3 may be bonded to each other to form a ring; and a part of hydrogen in each of R1 to R3 may be substituted with a halogen.)

Examples of the halogenated carbonate represented by any of the formulae (1) to (2) include fluoromethyl methyl carbonate, bis(fluoromethyl) carbonate, 4-fluoro-1,3-dioxolan-2-one and 4,5-difluoro-1,3-dioxolan-2-one. These materials may be used singly or in combinations of two or more kinds thereof.

Examples of the alkylbenzene represented by the formula (3) include tert-butylbenzene, tert-pentylbenzene, 1,1-diethylpropylbenzene and 2,2-diphenylpropane. These materials may be used singly or in combinations of two or more kinds thereof. Of these, from the standpoint of more likely obtaining the effects, tert-butylbenzene is preferable.

(Content)

A content of the halogenated carbonate represented by any of the formulae (1) to (2) is preferably 0.1% by mass or more and not more than 50% by mass, and more preferably 1% by mass or more and not more than 20% by mass relative to the whole mass of the electrolytic solution. Also, a content of the alkylbenzene represented by the formula (3) is preferably 0.1% by mass or more and not more than 5% by mass, and more preferably 0.1% by mass or more and not more than 1% by mass relative to the whole mass of the electrolytic solution. The halogenated carbonate represented by any of the formulae (1) to (2) and the alkylbenzene represented by the formula (3) are decomposed on the electrode surface to form a film on the occasion of charge/discharge. By controlling an amount of the film derived from the halogenated carbonate represented by any of the formulae (1) to (2) and an amount of the film derived from the alkylbenzene represented by the formula (3) to the foregoing optimal amounts, the generation of a gas can be remarkably suppressed.

In the nonaqueous electrolyte battery according to the first embodiment, for example, the foregoing lithium nickel complex oxide with a high nickel content or coated positive electrode material on the surface of which is formed the coating layer with a high nickel content (for example, a coating layer containing an oxide represented by the formula (III) wherein (q+r) is not more than 0.5) is used as the positive electrode active material. Also, a lithium nickel complex oxide with a high nickel content and other lithium complex oxide are mixed and used as the positive electrode active material. At that time, a content of the lithium nickel complex oxide with a high nickel content is preferably 50% by mass or more, and more preferably 70% by mass or more relative to a total mass of the positive electrode active material. In those cases, the decomposition reaction of the nonaqueous electrolytic solution is accelerated by a strong oxidizing power of the surface of the positive electrode active material in a charged state, and the generation of a gas is accelerated. According to this, there is a concern that the safety valve mechanism 15 is actuated by an increase of the internal pressure of the battery to be caused due to the generation of a gas, so that the battery is no longer useful. On the other hand, in the nonaqueous electrolyte battery according to the first embodiment, the electrolytic solution is allowed to contain the halogenated carbonate represented by any of the formulae (1) to (2) in an amount of 0.1% by mass or more and not more than 50% by mass and the alkylbenzene represented by the formula (3) in an amount of 0.1% by mass or more and not more than 5% by mass. According to this, even in the case of using, as the positive electrode active material, the lithium nickel complex oxide with a high nickel content or the coated positive electrode material on the surface of which is formed the coating layer with a high nickel content, the generation of a gas can be sufficiently suppressed. Also, even in the case of using the positive electrode active material having a high mixing ratio of the lithium nickel complex oxide with a high nickel content, the generation of a gas can be sufficiently suppressed.

(Mass Ratio)

Also, from the standpoint of obtaining more excellent effects, a mass ratio of the halogenated carbonate represented by any of the formulae (1) to (2) to the alkylbenzene represented by the formula (3) (halogenated carbonate/alkylbenzene) is preferably 0.1 or more and not more than 200, more preferably 0.1 or more and not more than 50, especially preferably 1 or more and not more than 50, and most preferably 1 or more and not more than 12.5.

(Other Solvent)

Also, the solvent may contain other solvent together with the halogenated carbonate represented by any of the formulae (1) to (2) and the alkylbenzene represented by the formula (3).

Examples of the other solvent include ethylene carbonate (EC), propylene carbonate, butylene carbonate, dimethyl carbonate (DMC), diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3- dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide.

These exemplified other solvents may be used singly or properly in combinations of two or more kinds thereof. Of these other solvents, at least one member selected from the group consisting of ethylene carbonate, propylene carbonate, dimethyl carbonate, diethyl carbonate and ethyl methyl carbonate is preferable. In that case, a combination of a high viscosity (high dielectric constant) solvent (for example, specific dielectric constant $\varepsilon \geq 30$) such as ethylene carbonate and propylene carbonate, and a low viscosity solvent (for example, viscosity $\leq 1$ mPa·s) such as dimethyl carbonate, ethyl methyl carbonate and diethyl carbonate is more preferable. This is because dissociation properties of the electrolyte salt and mobility of the ion are enhanced.

(Electrolyte Salt)

The electrolyte salt contains, for example, one or two or more kinds of light metal salts such as a lithium salt.

Examples of the lithium salt include lithium hexafluorophosphate ($LiPF_6$), lithium tetrafluoroborate, lithium perchlorate, lithium hexafluoroarsenate, lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl) and lithium bromide (LiBr). These exemplified electrolyte salts may be properly used in combinations of two or more kinds thereof.

(Manufacturing Method of Battery)

This nonaqueous electrolyte battery is, for example, manufactured in the following manufacturing method.

(Manufacture of Positive Electrode)

First of all, the positive electrode 21 is fabricated. First of all, a positive electrode material, a binder and a conductive agent are mixed to form a positive electrode mixture, which is then dispersed in an organic solvent to form a positive electrode mixture slurry in a paste form. Subsequently, the positive electrode mixture slurry is uniformly coated on the both surfaces of the positive electrode collector 21A by a doctor blade or a bar coater or the like and then dried. Finally, the coating film is compression molded by a roll press or the like while heating, if desired, thereby forming the positive electrode active material layer 21B. In that case, the compression molding may be repeatedly carried out plural times.

(Manufacture of Negative Electrode)

Next, the negative electrode 22 is fabricated. First of all, a negative electrode material and a binder and optionally, a conductive agent are mixed to form a negative electrode mixture, which is then dispersed in an organic solvent to form a negative electrode mixture slurry in a paste form. Subsequently, the negative electrode mixture slurry is uniformly coated on the both surfaces of the negative electrode collector 22A by a doctor blade or a bar coater or the like and then dried. Finally, the coating film is compression molded by a roll press or the like while heating, if desired, thereby forming the negative electrode active material layer 22B.

The negative electrode 22 may also be manufactured in the following manner. First of all, the negative electrode collector 22A made of an electrolytic copper foil or the like is prepared, and a negative electrode material is then deposited on the both surfaces of the electrode collector 22A by a vapor phase method such as a vapor deposition method, thereby forming plural negative electrode active material particles. Thereafter, if desired, an oxide-containing film is formed by a liquid phase method such as a liquid phase deposition method, or a metal material is formed by a liquid phase method such as an electrolytic plating method, or the both are formed, thereby forming the negative electrode active material layer 22B.

(Assembling of Battery)

Assembling of the nonaqueous electrolyte battery is carried out in the following manner. First of all, the positive electrode lead 25 is installed in the positive electrode collector 21A by means of welding or the like, and the negative electrode lead 26 is also installed in the negative electrode collector 22A by means of welding or the like. Subsequently, the positive electrode 21 and the negative electrode 22 are laminated via the separator 23 and wound to fabricate the wound electrode body 20, and the center pin 24 is then inserted into the winding center thereof. Subsequently, the wound electrode body 20 is housed in the inside of the battery can 11 while being interposed between a pair of the insulating plates 12 and 13; and a tip portion of the positive electrode lead 25 is welded to the safety valve mechanism 15, whereas a tip portion of the negative electrode lead 26 is welded to the battery can 11.

Subsequently, the foregoing electrolytic solution is injected into the inside of the battery can 11 and impregnated in the separator 23. Finally, the battery lid 14, the safety valve mechanism 15 and the positive temperature coefficient device 16 are fixed to the open end portion of the battery can 11 upon being caulked via a gasket 17. There is thus completed the nonaqueous electrolyte battery shown in FIGS. 1 and 2.

<Effect>

In the nonaqueous electrolyte battery according to the first embodiment, the electrolytic solution contains the halogenated carbonate represented by any of the formulae (1) to (2) in an amount of 0.1% by mass or more and not more than 50% by mass and the alkylbenzene represented by the formula (3) in an amount of 0.1% by mass or more and not more than 5% by mass. According to this, the generation of a gas at the time of high temperature storage can be suppressed. Also, it is possible to prevent the matter that the safety valve mechanism 15 is actuated by an increase of the internal pressure of the battery to be caused due to the generation of a gas, so that the battery is no longer useful from occurring.

2. Second Embodiment (Configuration of Battery)

Figure 3:
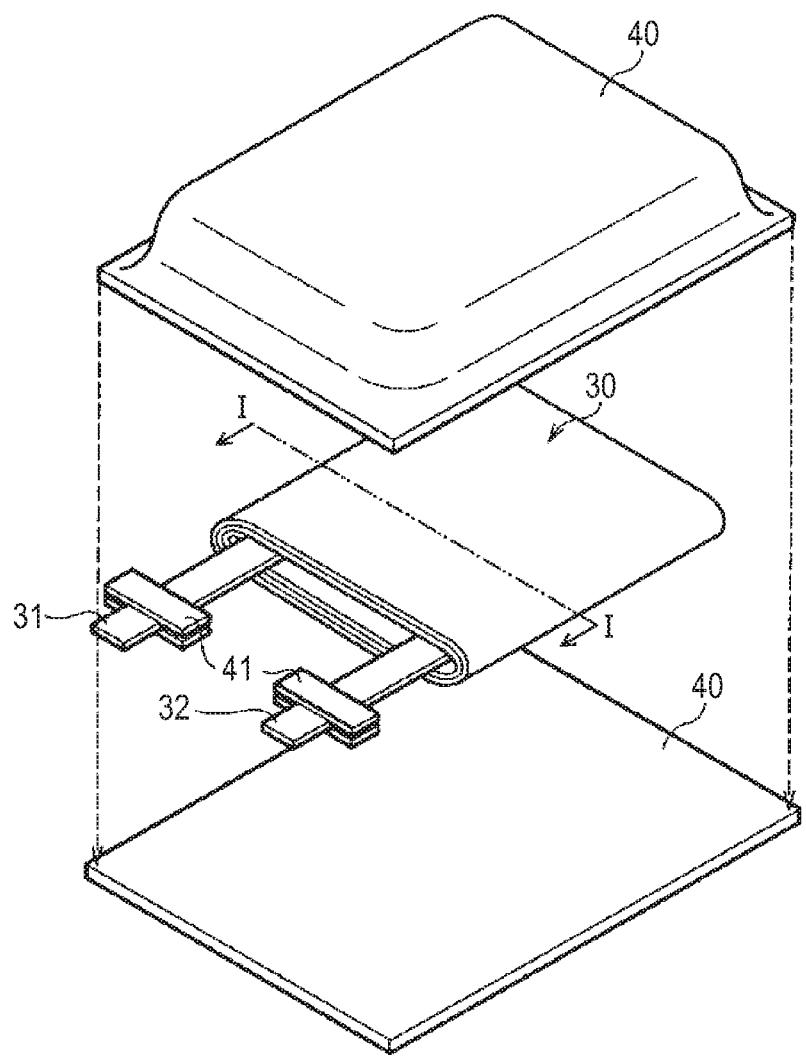
FIG. 3 is a sectional view showing a configuration example of a nonaqueous electrolyte battery according to an embodiment.

A nonaqueous electrolyte battery according to a second embodiment is described. FIG. 3 expresses an exploded perspective configuration of a nonaqueous electrolyte battery according to the second embodiment; and FIG. 4 enlargedly shows a section along an I-I line of a wound electrode body 30 shown in FIG. 3.

This nonaqueous electrolyte battery is chiefly a nonaqueous electrolyte battery in which a wound electrode body 30 having a positive electrode lead 31 and a negative electrode lead 32 installed therein is housed in the inside of a package member 40 in a film form. The battery structure using this package member 40 in a film form is called a laminated film type.

The positive electrode lead 31 and the negative electrode lead 32 are each led out in, for example, the same direction from the inside toward the outside of the package member

40. The positive electrode lead 31 is, for example, constituted of a metal material such as aluminum, and the negative electrode lead 32 is, for example, constituted of a metal material such as copper, nickel and stainless steel. Such a metal material is, for example, formed in a thin plate state or a network state.

The package member 40 is, for example, constituted of an aluminum laminated film obtained by sticking a nylon film, an aluminum foil and a polyethylene film in this order. For example, this package member 40 has a structure in which respective outer edges of the two rectangular aluminum laminated films are allowed to adhere to each other by means of fusion or with an adhesive such that the polyethylene film is disposed opposing to the wound electrode body 30.

A contact film 41 is inserted between the package member 40 and each of the positive electrode lead 31 and the negative electrode lead 32 for the purpose of preventing invasion of the outside air from occurring. This contact film 41 is constituted of a material having adhesion to each of the positive electrode lead 31 and the negative electrode lead 32. Examples of such a material include polyolefin resins such as polyethylene, polypropylene, modified polyethylene and modified polypropylene.

The package member 40 may also be constituted of a laminated film having other lamination structure, or constituted of a polymer film such as polypropylene or a metal film, in place of the foregoing aluminum laminated film.

Figure 4:
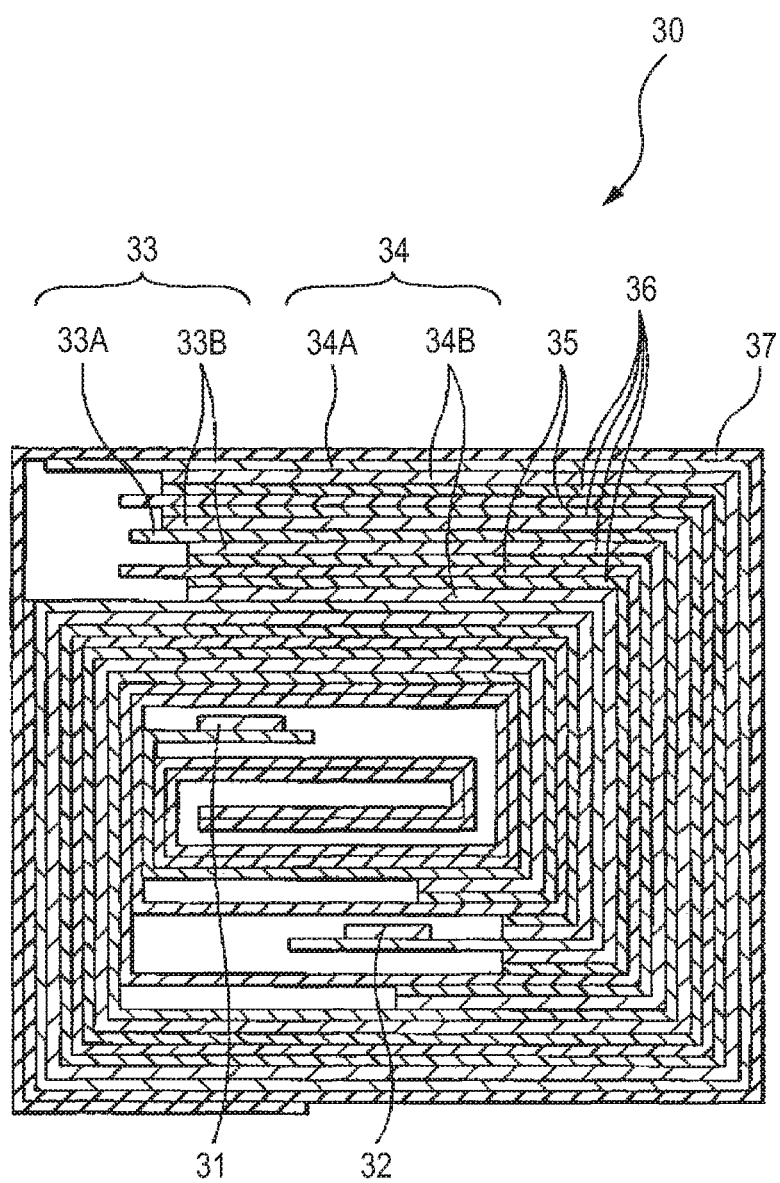
FIG. 4 is a sectional view along an I-I line of a wound electrode body in FIG. 3.

FIG. 4 shows a sectional configuration along an I-I line of the wound electrode body 30 shown in FIG. 3. This wound electrode body 30 is a wound electrode body prepared by laminating a positive electrode 33 and a negative electrode 34 via a separator 35 and an electrolyte 36 and winding the laminate, and an outermost peripheral part thereof is protected by a protective tape 37.

The positive electrode 33 is, for example, a positive electrode in which a positive electrode active material layer 33B is provided on the both surfaces of a positive electrode collector 33A. The negative electrode 34 is, for example, a negative electrode in which a negative electrode active material layer 34B is provided on the both surfaces of a negative electrode collector 34A, and the negative electrode active material layer 34B is disposed opposing to the positive electrode active material layer 33B. Configurations of the positive electrode collector 33A, the positive electrode active material layer 33B, the negative electrode collector 34A, the negative electrode active material layer 34B and the separator 35 are the same as those of the positive electrode collector 21A, the positive electrode active material layer 21B, the negative electrode collector 22A, the negative electrode active material layer 22B and the separator 23 in the first embodiment according to the present application, respectively.

The electrolyte 36 is an electrolyte in a so-called gel form, which contains the same electrolytic solution as that in the first embodiment according to the present application and a polymer compound for holding it therein. The electrolyte in a gel form is preferable because not only a high ion conductivity (for example, 1 mS/cm or more at room temperature) is obtainable, but the liquid leakage is prevented from occurring.

Examples of the polymer compound include polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polystyrene and polycarbonate. These materials may be used singly or in admixture of plural kinds thereof. Of these, polyacrylonitrile, polyvinylidene fluoride, polyhexafluoropropylene and polyethylene oxide are preferable because these materials are electrochemically stable.

(Manufacturing Method of Battery)

This nonaqueous electrolyte battery is, for example, manufactured by any of the following three kinds of manufacturing methods (first to third manufacturing methods).

(First Manufacturing Method)

In a first manufacturing method, first of all, for example, the positive electrode active material layer 33B is formed on the both surfaces of the positive electrode collector 33A by the same fabrication procedures as those of the positive electrode 21 and the negative electrode 22 according to the first embodiment, thereby fabricating the positive electrode 33. Also, the negative electrode active material layer 34B is formed on the both surfaces of the negative electrode collector 34A, thereby fabricating the negative electrode 34.

Subsequently, a precursor solution containing the electrolytic solution according to the first embodiment, a polymer compound and a solvent is prepared and coated on each of the positive electrode 33 and the negative electrode 34, and the solvent is then vaporized to form the electrolyte 36 in a gel form. Subsequently, the positive electrode lead 31 is installed in the positive electrode collector 33A, and the negative electrode lead 32 is also installed in the negative electrode collector 34A.

Subsequently, the positive electrode 33 and the negative electrode 34 each having the electrolyte 36 formed therein are laminated via the separator 35, the laminate is then wound in a longitudinal direction thereof, and the protective tape 37 is allowed to adhere to an outermost peripheral part thereof, thereby fabricating the wound electrode body 30. Finally, for example, the wound electrode body 30 is interposed between the two package members 40 in a film form, and the outer edges of the package members 40 are allowed to adhere to each other by means of heat fusion or the like, thereby sealing the wound electrode body 30 therein. On that occasion, the contact film 41 is inserted between each of the positive electrode lead 31 and the negative electrode lead 32 and the package member 40. There is thus completed the nonaqueous electrolyte battery shown in FIGS. 3 and 4.

(Second Manufacturing Method)

In a second manufacturing method, first of all, the positive electrode lead 31 is installed in the positive electrode 33, and the negative electrode lead 32 is also installed in the negative electrode 34. Subsequently, the positive electrode 33 and the negative electrode 34 are laminated via the separator 35 and wound, and the protective tape 37 is then allowed to adhere to an outermost peripheral part of the resulting laminate, thereby fabricating a wound body serving as a precursor of the wound electrode body 30.

Subsequently, the wound body is interposed between the two package members 40 in a film form, and the outer edges exclusive of one side are allowed to adhere to each other by means of heat fusion or the like, thereby housing the wound body in the inside of the package member 40 in a bag form. Subsequently, an electrolyte composition containing an electrolytic solution, a monomer as a raw material of the polymer compound and a polymerization initiator and optionally, other material such as a polymerization inhibitor is prepared and injected into the inside of the package member 40 in a bag form. Thereafter, an opening of the package member 40 is hermetically sealed by means of heat fusion or the like. Finally, the monomer is heat polymerized to form a polymer compound, thereby forming the electrolyte 36 in a gel form. There is thus completed the nonaqueous electrolyte battery shown in FIGS. 3 and 4.

(Third Manufacturing Method)

In a third manufacturing method, first of all, a wound body is formed and housed in the inside of the package member 40 in a bag form in the same manner as that in the second manufacturing method, except for using the separator 35 having a polymer compound formed on the both surfaces thereof.

Examples of the polymer compound which is coated on this separator 35 include polymers composed of, as a component, vinylidene fluoride, namely a homopolymer, a copolymer or a multi-component copolymer, or the like. Specific examples thereof include polyvinylidene fluoride; a binary copolymer composed of, as components, vinylidene fluoride and hexafluoropropylene; and a ternary copolymer composed of, as components, vinylidene fluoride, hexafluoropropylene and chlorotrifluoroethylene.

The polymer compound may contain one or two or more kinds of other polymer compound together with the foregoing polymer composed of, as a component, vinylidene fluoride. Subsequently, an electrolytic solution is prepared and injected into the inside of the package member 40, and an opening of the package member 40 is then hermetically sealed by means of heat fusion or the like. Finally, the separator 35 is brought into intimate contact with each of the positive electrode 33 and the negative electrode 34 via the polymer compound upon heating while adding a weight to the package member 40. According to this, the electrolytic solution is impregnated into the polymer compound, and the polymer compound is gelled to form the electrolyte 36. There is thus completed the nonaqueous electrolyte battery shown in FIGS. 3 and 4.

<Effect>

According to the second embodiment, the same effects as those in the first embodiment according to the present application are obtainable. Also, the battery blister at the time of high temperature storage can be suppressed.

3. Third Embodiment

A nonaqueous electrolyte battery according to a third embodiment is described. The nonaqueous electrolyte battery according to the third embodiment is the same as the nonaqueous electrolyte battery according to the second embodiment, except that the electrolytic solution is used as it is, in place of the electrolytic solution held on a polymer compound (the electrolyte 36). In consequence, its configuration is hereunder described in detail centering on points different from those in the second embodiment according to the present application.

(Configuration of Battery)

In the nonaqueous electrolyte battery according to the third embodiment, an electrolytic solution is used in place of the electrolyte 36 in a gel form. In consequence, the wound electrode body 30 has a configuration in which the electrolyte 36 is omitted, and the electrolytic solution according to the first embodiment is impregnated in the separator 35.

(Manufacturing Method of Battery)

This nonaqueous electrolyte battery is, for example, manufactured in the following manner.

First all, for example, a positive electrode active material, a binder and a conductive agent are mixed to prepare a positive electrode mixture, which is then dispersed in a solvent such as N-methyl-2-pyrrolidone to prepare a positive electrode mixture slurry. Next, this positive electrode mixture slurry is coated on the both surfaces of the positive electrode collector 33A, dried and then compression molded to form the positive electrode active material layer 33B, thereby fabricating the positive electrode 33. Next, for example, the positive electrode lead 31 is connected to the positive electrode collector 33A by means of, for example, ultrasonic welding, spot welding, etc.

Also, for example, a negative electrode material and a binder are mixed to prepare a negative electrode mixture, which is then dispersed in a solvent such as N-methyl-2-pyrrolidone to prepare a negative electrode mixture slurry. Next, this negative electrode mixture slurry is coated on the both surfaces of the negative electrode collector 34A, dried and then compression molded to form the negative electrode active material layer 34B, thereby fabricating the negative electrode 34. Next, for example, the negative electrode lead 32 is connected to the negative electrode collector 34A by means of, for example, ultrasonic welding, spot welding, etc.

Subsequently, the positive electrode 33 and the negative electrode 34 are wound via the separator 35 and interposed in the inside of the package member 40, and an electrolytic solution is then injected into the inside of the package member 40, followed by hermetically sealing the package member 40. According to this, the nonaqueous electrolyte battery shown in FIGS. 3 and 4 is obtained.

<Effect>

The third embodiment according to the present application gives rise to the same effects as those in the first embodiment. Also, the battery blister at the time of high temperature storage can be suppressed.

EXAMPLES

The present application is specifically described below with reference to the following Examples, but it should not be construed that the present application is limited only to these Examples. In the following Examples, the compounds represented by the following formulae (4) to (8) are hereunder called Compounds A to D, respectively for the sake of convenience of explanation.

Compound A (4)

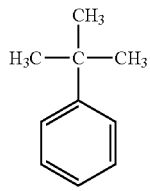

tert-Butylbenzene

Compound B (5)

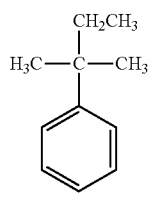

tert-Pentylbenzene

-continued

Compound C

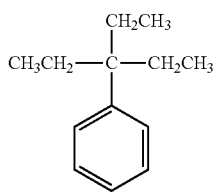

1,2-Diethylpropylbenzene

Compound D

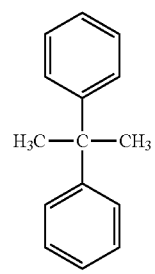

2,2-Diphenylpropane (7)

(8)

Example 1-1

As Example 1-1, a lithium ion secondary battery (hereinafter referred to as "secondary battery") shown in FIGS. 1 and 2 was fabricated in the following manner. First of all, the positive electrode 21 was fabricated in the following manner. 91 parts by mass of a lithium nickel cobalt manganese complex oxide ($LiNi_{0.5}Co_{0.2}Mn_{0.3}O_2$) as a positive electrode active material, 6 parts by mass of graphite as a conductive agent and 3 parts by mass of polyvinylidene fluoride as a binder were mixed to prepare a positive electrode mixture. This positive electrode mixture was dispersed in N-methyl-2-pyrrolidone to prepare a positive electrode mixture slurry in a paste form.

Finally, the positive electrode mixture slurry was coated on the both surfaces of the positive electrode collector 21A made of a strip-shaped aluminum foil (12 μm in thickness), and after drying, the resultant was compression molded by a roll press to form the positive electrode active material layer 21B. Thereafter, the aluminum-made positive electrode lead 25 was installed in one end of the positive electrode collector 21A by means of welding.

Next, the negative electrode 22 was fabricated. On the occasion of fabricating the negative electrode 22, 97 parts by mass of an artificial graphite powder as a negative electrode active material and 3 parts by mass of polyvinylidene fluoride as a binder were mixed to prepare a negative electrode mixture, which was then dispersed in N-methyl-2-pyrrolidone. Then, the dispersion was coated on the both surfaces of the negative electrode collector 22A made of a strip-shaped copper foil (15 μm in thickness), and after drying, the resultant was compression molded to form the negative electrode active material layer 22B. Thereafter, the nickel-made negative electrode lead 26 was installed in one end of the negative electrode collector 22A.

Subsequently, the positive electrode 21, the separator 23 made of a microporous polyethylene film (20 μm in thickness) and the negative electrode 22 were laminated in this order and spirally wound many times, and an end of winding was fixed by an adhesive tape to form the wound electrode body 20. Subsequently, the nickel-plated iron-made battery can 11 was prepared; the wound electrode body 20 was interposed between a pair of the insulating plates 12 and 13; and the negative electrode lead 26 was welded to the battery can 11, and also, the positive electrode lead 25 was welded to the safety valve mechanism 15, followed by housing the wound electrode body 20 in the inside of the battery can 11. Subsequently, an electrolytic solution was injected into the inside of the battery can 11 in a pressure reduction mode.

As the electrolytic solution, an electrolytic solution prepared in the following manner was used. That is, ethylene carbonate (EC), 4-fluoro-1,3-dioxolan-2-one (FEC), dimethyl carbonate (DMC), Compound A and $LiPF_6$ were mixed in a proportion of 19.9/0.1/64.9/0.1/15 in terms of a mass ratio (EC/FEC/DMC/Compound A/$LiPF_6$), thereby preparing the electrolytic solution.

Subsequently, the battery can 11 was caulked via the gasket 17 having asphalt coated on the surface thereof, thereby fixing the safety valve mechanism 15, the positive temperature coefficient device 16 and the battery lid 14. In this way, the air tightness in the inside of the battery can 11 was ensured, and a cylinder type secondary battery was completed.

Example 1-2

Ethylene carbonate (EC), 4-fluoro-1,3-dioxolan-2-one (FEC), dimethyl carbonate (DMC), Compound A and $LiPF_6$ were mixed in a$_{proportion}$ of 19.9/0.1/64/1/15 in terms of a mass ratio (EC/FEC/DMC/Compound A/$LiPF_6$), thereby preparing an electrolytic solution. A secondary battery of Example 1-2 was fabricated in the same manner as in Example 1-1, except for the foregoing point.

Example 1-3

Ethylene carbonate (EC), 4-fluoro-1,3-dioxolan-2-one (FEC), dimethyl carbonate (DMC), Compound A and $LiPF_6$ were mixed in a proportion of 19.9/0.1/60/5/15 in terms of a mass ratio (EC/FEC/DMC/Compound A/$LiPF_6$), thereby preparing an electrolytic solution. A secondary battery of Example 1-3 was fabricated in the same manner as in Example 1-1, except for the foregoing point.

Example 1-4

Ethylene carbonate (EC), 4-fluoro-1,3-dioxolan-2-one (FEC), dimethyl carbonate (DMC), Compound A and $LiPF_6$ were mixed in a proportion of 19/1/64.9/0.1/15 in terms of a mass ratio (EC/FEC/DMC/Compound A/$LiPF_6$), thereby preparing an electrolytic solution. A secondary battery of Example 1-4 was fabricated in the same manner as in Example 1-1, except for the foregoing point.

Example 1-5

Ethylene carbonate (EC), 4-fluoro-1,3-dioxolan-2-one (FEC), dimethyl carbonate (DMC), Compound A and $LiPF_6$ were mixed in a proportion of 19/1/64.85/0.15/15 in terms of a mass ratio (EC/FEC/DMC/Compound A/$LiPF_6$), thereby preparing an electrolytic solution. A secondary battery of Example 1-5 was fabricated in the same manner as in Example 1-1, except for the foregoing point.

Example 1-6

Ethylene carbonate (EC), 4-fluoro-1,3-dioxolan-2-one (FEC), dimethyl carbonate (DMC), Compound A and $LiPF_6$ were mixed in a proportion of 19/1/64.8/0.2/15 in terms of a mass ratio (EC/FEC/DMC/Compound A/LiPF$_6$), thereby preparing an electrolytic solution. A secondary battery of Example 1-6 was fabricated in the same manner as in Example 1-1, except for the foregoing point.

Example 1-7

Ethylene carbonate (EC), 4-fluoro-1,3-dioxolan-2-one (FEC), dimethyl carbonate (DMC), Compound A and LiPF$_6$ were mixed in a proportion of 19/1/64.6/0.4/15 in terms of a mass ratio (EC/FEC/DMC/Compound A/LiPF$_6$), thereby preparing an electrolytic solution. A secondary battery of Example 1-7 was fabricated in the same manner as in Example 1-1, except for the foregoing point.

Example 1-8

Ethylene carbonate (EC), 4-fluoro-1,3-dioxolan-2-one (FEC), dimethyl carbonate (DMC), Compound A and LiPF$_6$ were mixed in a proportion of 19/1/64/1/15 in terms of a mass ratio (EC/FEC/DMC/Compound A/LiPF$_6$), thereby preparing an electrolytic solution. A secondary battery of Example 1-8 was fabricated in the same manner as in Example 1-1, except for the foregoing point.

Example 1-9

Ethylene carbonate (EC), 4-fluoro-1,3-dioxolan-2-one (FEC), dimethyl carbonate (DMC), Compound A and LiPF$_6$ were mixed in a proportion of 19/1/63/2/15 in terms of a mass ratio (EC/FEC/DMC/Compound A/LiPF$_6$), thereby preparing an electrolytic solution. A secondary battery of Example 1-9 was fabricated in the same manner as in Example 1-1, except for the foregoing point.

Example 1-10

Ethylene carbonate (EC), 4-fluoro-1,3-dioxolan-2-one (FEC), dimethyl carbonate (DMC), Compound A and LiPF$_6$ were mixed in a proportion of 19/1/60/5/15 in terms of a mass ratio (EC/FEC/DMC/Compound A/LiPF$_6$), thereby preparing an electrolytic solution. A secondary battery of Example 1-10 was fabricated in the same manner as in Example 1-1, except for the foregoing point.

Example 1-11

Ethylene carbonate (EC), 4-fluoro-1,3-dioxolan-2-one (FEC), dimethyl carbonate (DMC), Compound A and LiPF$_6$ were mixed in a proportion of 15/5/64.9/0.1/15 in terms of a mass ratio (EC/FEC/DMC/Compound A/LiPF$_6$), thereby preparing an electrolytic solution. A secondary battery of Example 1-11 was fabricated in the same manner as in Example 1-1, except for the foregoing point.

Example 1-12

Ethylene carbonate (EC), 4-fluoro-1,3-dioxolan-2-one (FEC), dimethyl carbonate (DMC), Compound A and LiPF$_6$ were mixed in a proportion of 15/5/64.75/0.25/15 in terms of a mass ratio (EC/FEC/DMC/Compound A/LiPF$_6$), thereby preparing an electrolytic solution. A secondary battery of Example 1-12 was fabricated in the same manner as in Example 1-1, except for the foregoing point.

Example 1-13

Ethylene carbonate (EC), 4-fluoro-1,3-dioxolan-2-one (FEC), dimethyl carbonate (DMC), Compound A and LiPF$_6$ were mixed in a proportion of 15/5/64.6/0.4/15 in terms of a mass ratio (EC/FEC/DMC/Compound A/LiPF$_6$), thereby preparing an electrolytic solution. A secondary battery of Example 1-13 was fabricated in the same manner as in Example 1-1, except for the foregoing point.

Example 1-14

Ethylene carbonate (EC), 4-fluoro-1,3-dioxolan-2-one (FEC), dimethyl carbonate (DMC), Compound A and LiPF$_6$ were mixed in a proportion of 15/5/64.5/0.5/15 in terms of a mass ratio (EC/FEC/DMC/Compound A/LiPF$_6$), thereby preparing an electrolytic solution. A secondary battery of Example 1-14 was fabricated in the same manner as in Example 1-1, except for the foregoing point.

Example 1-15

Ethylene carbonate (EC), 4-fluoro-1,3-dioxolan-2-one (FEC), dimethyl carbonate (DMC), Compound A and LiPF$_6$ were mixed in a proportion of 15/5/64.25/0.75/15 in terms of a mass ratio (EC/FEC/DMC/Compound A/LiPF$_6$), thereby preparing an electrolytic solution. A secondary battery of Example 1-15 was fabricated in the same manner as in Example 1-1, except for the foregoing point.

Example 1-16

Ethylene carbonate (EC), 4-fluoro-1,3-dioxolan-2-one (FEC), dimethyl carbonate (DMC), Compound A and LiPF$_6$ were mixed in a proportion of 15/5/64/1/15 in terms of a mass ratio (EC/FEC/DMC/Compound A/LiPF$_6$), thereby preparing an electrolytic solution. A secondary battery of Example 1-16 was fabricated in the same manner as in Example 1-1, except for the foregoing point.

Example 1-17

Ethylene carbonate (EC), 4-fluoro-1,3-dioxolan-2-one (FEC), dimethyl carbonate (DMC), Compound A and LiPF$_6$ were mixed in a proportion of 15/5/63/2/15 in terms of a mass ratio (EC/FEC/DMC/Compound A/LiPF$_6$), thereby preparing an electrolytic solution. A secondary battery of Example 1-17 was fabricated in the same manner as in Example 1-1, except for the foregoing point.

Example 1-18

Ethylene carbonate (EC), 4-fluoro-1,3-dioxolan-2-one (FEC), dimethyl carbonate (DMC), Compound A and LiPF$_6$ were mixed in a proportion of 15/5/60/5/15 in terms of a mass ratio (EC/FEC/DMC/Compound A/LiPF$_6$), thereby preparing an electrolytic solution. A secondary battery of Example 1-18 was fabricated in the same manner as in Example 1-1, except for the foregoing point.

Example 1-19

4-Fluoro-1,3-dioxolan-2-one (FEC), dimethyl carbonate (DMC), Compound A and LiPF$_6$ were mixed in a proportion of 20/64.9/0.1/15 in terms of a mass ratio (FEC/DMC/Compound A/LiPF$_6$), thereby preparing an electrolytic solution. A secondary battery of Example 1-19 was fabricated in the same manner as in Example 1-1, except for the foregoing point.

Example 1-20

4-Fluoro-1,3-dioxolan-2-one (FEC), dimethyl carbonate (DMC), Compound A and LiPF$_6$ were mixed in a proportion of 20/64/1/15 in terms of a mass ratio (FEC/DMC/Compound A/LiPF$_6$), thereby preparing an electrolytic solution. A secondary battery of Example 1-20 was fabricated in the same manner as in Example 1-1, except for the foregoing point.

Example 1-21

4-Fluoro-1,3-dioxolan-2-one (FEC), dimethyl carbonate (DMC), Compound A and LiPF$_6$ were mixed in a proportion of 20/63.4/1.6/15 in terms of a mass ratio (FEC/DMC/Compound A/LiPF$_6$), thereby preparing an electrolytic solution. A secondary battery of Example 1-21 was fabricated in the same manner as in Example 1-1, except for the foregoing point.

Example 1-22

4-Fluoro-1,3-dioxolan-2-one (FEC), dimethyl carbonate (DMC), Compound A and LiPF$_6$ were mixed in a proportion of 20/63/2/15 in terms of a mass ratio (FEC/DMC/Compound A/LiPF$_6$), thereby preparing an electrolytic solution. A secondary battery of Example 1-22 was fabricated in the same manner as in Example 1-1, except for the foregoing point.

Example 1-23

4-Fluoro-1,3-dioxolan-2-one (FEC), dimethyl carbonate (DMC), Compound A and LiPF$_6$ were mixed in a proportion of 20/62/3/15 in terms of a mass ratio (FEC/DMC/Compound A/LiPF$_6$), thereby preparing an electrolytic solution. A secondary battery of Example 1-23 was fabricated in the same manner as in Example 1-1, except for the foregoing point.

Example 1-24

4-Fluoro-1,3-dioxolan-2-one (FEC), dimethyl carbonate (DMC), Compound A and LiPF$_6$ were mixed in a proportion of 20/61/4/15 in terms of a mass ratio (FEC/DMC/Compound A/LiPF$_6$), thereby preparing an electrolytic solution. A secondary battery of Example 1-24 was fabricated in the same manner as in Example 1-1, except for the foregoing point.

Example 1-25

4-Fluoro-1,3-dioxolan-2-one (FEC), dimethyl carbonate (DMC), Compound A and LiPF$_6$ were mixed in a proportion of 20/60/5/15 in terms of a mass ratio (FEC/DMC/Compound A/LiPF$_6$), thereby preparing an electrolytic solution. A secondary battery of Example 1-25 was fabricated in the same manner as in Example 1-1, except for the foregoing point.

Example 1-26

4-Fluoro-1,3-dioxolan-2-one (FEC), dimethyl carbonate (DMC), Compound A and LiPF$_6$ were mixed in a proportion of 50/34.9/0.1/15 in terms of a mass ratio (FEC/DMC/Compound A/LiPF$_6$), thereby preparing an electrolytic solution. A secondary battery of Example 1-26 was fabricated in the same manner as in Example 1-1, except for the foregoing point.

Example 1-27

4-Fluoro-1,3-dioxolan-2-one (FEC), dimethyl carbonate (DMC), Compound A and LiPF$_6$ were mixed in a proportion of 50/34/1/15 in terms of a mass ratio (FEC/DMC/Compound A/LiPF$_6$), thereby preparing an electrolytic solution. A secondary battery of Example 1-27 was fabricated in the same manner as in Example 1-1, except for the foregoing point.

Example 1-28

4-Fluoro-1,3-dioxolan-2-one (FEC), dimethyl carbonate (DMC), Compound A and LiPF$_6$ were mixed in a proportion of 50/30/5/15 in terms of a mass ratio (FEC/DMC/Compound A/LiPF$_6$), thereby preparing an electrolytic solution. A secondary battery of Example 1-28 was fabricated in the same manner as in Example 1-1, except for the foregoing point.

Comparative Example 1-1

Ethylene carbonate (EC), dimethyl carbonate (DMC) and LiPF$_6$ were mixed in a proportion of 20/65/15 in terms of a mass ratio (EC/DMC/LiPF$_6$), thereby preparing an electrolytic solution. A secondary battery of Comparative Example 1-1 was fabricated in the same manner as in Example 1-1, except for the foregoing point.

Comparative Example 1-2

Ethylene carbonate (EC), dimethyl carbonate (DMC), Compound A and LiPF$_6$ were mixed in a proportion of 20/64/1/15 in terms of a mass ratio (EC/DMC/Compound A/LiPF$_6$), thereby preparing an electrolytic solution. A secondary battery of Comparative Example 1-2 was fabricated in the same manner as in Example 1-1, except for the foregoing point.

Comparative Example 1-3

Ethylene carbonate (EC), 4-fluoro-1,3-dioxolan-2-one (FEC), dimethyl carbonate (DMC) and LiPF$_6$ were mixed in a proportion of 15/5/65/15 in terms of a mass ratio (EC/FEC/DMC/LiPF$_6$), thereby preparing an electrolytic solution. A secondary battery of Comparative Example 1-3 was fabricated in the same manner as in Example 1-1, except for the foregoing point.

Comparative Example 1-4

Ethylene carbonate (EC), 4-fluoro-1,3-dioxolan-2-one (FEC), dimethyl carbonate (DMC), Compound A and LiPF$_6$ were mixed in a proportion of 15/5/55/10/15 in terms of a mass ratio (EC/FEC/DMC/Compound A/LiPF$_6$), thereby preparing an electrolytic solution. A secondary battery of Comparative Example 1-4 was fabricated in the same manner as in Example 1-1, except for the foregoing point.

Comparative Example 1-5

4-Fluoro-1,3-dioxolan-2-one (FEC), dimethyl carbonate (DMC), Compound A and LiPF$_6$ were mixed in a proportion of 80/4/1/15 in terms of a mass ratio (FEC/DMC/Compound A/LiPF$_6$), thereby preparing an electrolytic solution. A secondary battery of Comparative Example 1-5 was fabricated in the same manner as in Example 1-1, except for the foregoing point.

Comparative Example 1-6

Ethylene carbonate (EC), 4-fluoro-1,3-dioxolan-2-one (FEC), dimethyl carbonate (DMC), cyclohexylbenzene (CHB) and $LiPF_6$ were mixed in a proportion of 15/5/64/1/15 in terms of a mass ratio (EC/FEC/DMC/CHB/$LiPF_6$), thereby preparing an electrolytic solution. A secondary battery of Comparative Example 1-6 was fabricated in the same manner as in Example 1-1, except for the foregoing point.

Comparative Example 1-7

Ethylene carbonate (EC), vinylene carbonate (VC), dimethyl carbonate (DMC), Compound A and $LiPF_6$ were mixed in a proportion of 15/5/64/1/15 in terms of a mass ratio (EC/VC/DMC/Compound A/$LiPF_6$), thereby preparing an electrolytic solution. A secondary battery of Comparative Example 1-7 was fabricated in the same manner as in Example 1-1, except for the foregoing point.

Comparative Examples 1-8 to 1-11

$LiCoO_2$ was used as the positive electrode active material in place of $LiNi_{0.5}Co_{0.2}Mn_{0.3}O_2$. Secondary batteries of Comparative Examples 1-8 to 1-11 were prepared in the same manners as those in Comparative Examples 1-1, 1-2 and 1-3 and Example 1-16, respectively, except for the foregoing point.

With respect to the thus fabricated secondary batteries of Examples 1-1 to 1-28 and Comparative Examples 1-1 to 1-11, an operating time of safety valve and cycle characteristics were determined in the following manners.

(Operating Time of Safety Valve)

An operating time of safety valve was determined in the following manner. That is, first of all, charge/discharge of two cycles was carried out in an environment at 23° C., thereby measuring a discharge amount at the second cycle. Subsequently, the secondary battery was charged in a constant current density of 1 mA/cm² under the same environment until the battery voltage reached a prescribed voltage (4.2 V) and further charged at a constant voltage of a prescribed voltage (4.2 V) until the current density reached 0.02 mA/cm². Thereafter, the secondary battery was stored at 80° C., and a time until a shut-off valve was actuated was determined.

(Cycle Characteristics)

Cycle characteristics were determined in the following manner. That is, first of all, charge/discharge of two cycles was carried out in an environment at 23° C., thereby measuring a discharge amount at the second cycle. Subsequently, the secondary battery was subjected to charge/discharge of 298 cycles under the same environment, thereby determining a discharge capacity at the 300th cycle. Finally, a discharge capacity retention rate was calculated according to the following expression.

Discharge capacity retention rate (%)={(Discharge capacity at the 300th cycle)/(Discharge capacity at the second cycle)}×100(%)

As a charge/discharge condition of one cycle, the battery was subjected to constant-current and constant-voltage charge to an upper limit voltage of 4.2 V in a charge current of 0.2 C and then subjected to constant-current discharge to a cut-off voltage of 2.5 V in a discharge current of 0.2 C. The term "0.2 C" as referred to herein is a current value at which a theoretical capacity is completely discharged (charged) for 5 hours.

Measurement results are shown in Table 1-1. Also, in order to review an optimal mass ratio (halogenated carbonate/alkylbenzene), a summary of the relationship between the mass ratio and the operating time of safety valve is shown in Table 1-2.

TABLE 1-1

| | Positive electrode active material | Negative electrode | Halogenated carbonate | Content [% by mass] | Alkyl-benzene | Content [% by mass] | Mass ratio | Operating time of safety valve [h] | Cycle retention rate [%] |
|---|---|---|---|---|---|---|---|---|---|
| Example 1-1 | $LiNi_{0.5}Co_{0.2}Mn_{0.3}O_2$ | Artificial graphite | FEC | 0.1 | Compound A | 0.1 | 1 | 715 | 82 |
| Example 1-2 | | | | | | 1 | 0.1 | 708 | 81 |
| Example 1-3 | | | | | | 5 | 0.02 | 687 | 80 |
| Example 1-4 | | | | 1 | | 0.1 | 10 | 720 | 88 |
| Example 1-5 | | | | | | 0.15 | 6.67 | 723 | 88 |
| Example 1-6 | | | | | | 0.2 | 5 | 727 | 87 |
| Example 1-7 | | | | | | 0.4 | 2.5 | 726 | 87 |
| Example 1-8 | | | | | | 1 | 1 | 725 | 86 |
| Example 1-9 | | | | | | 2 | 0.5 | 716 | 84 |
| Example 1-10 | | | | | | 5 | 0.2 | 709 | 83 |
| Example 1-11 | | | | 5 | | 0.1 | 50 | 706 | 87 |
| Example 1-12 | | | | | | 0.25 | 20 | 710 | 88 |
| Example 1-13 | | | | | | 0.4 | 12.5 | 715 | 88 |
| Example 1-14 | | | | | | 0.5 | 10 | 724 | 88 |
| Example 1-15 | | | | | | 0.75 | 6.67 | 726 | 88 |
| Example 1-16 | | | | | | 1 | 5 | 728 | 88 |
| Example 1-17 | | | | | | 2 | 2.5 | 727 | 88 |
| Example 1-18 | | | | | | 5 | 1 | 724 | 87 |
| Example 1-19 | | | | 20 | | 0.1 | 200 | 695 | 87 |
| Example 1-20 | | | | | | 1 | 20 | 709 | 87 |
| Example 1-21 | | | | | | 1.6 | 12.5 | 718 | 87 |
| Example 1-22 | | | | | | 2 | 10 | 724 | 87 |
| Example 1-23 | | | | | | 3 | 6.67 | 726 | 86 |
| Example 1-24 | | | | | | 4 | 5 | 726 | 86 |
| Example 1-25 | | | | | | 5 | 4 | 725 | 86 |
| Example 1-26 | | | | 50 | | 0.1 | 500 | 645 | 83 |
| Example 1-27 | | | | | | 1 | 50 | 702 | 83 |
| Example 1-28 | | | | | | 5 | 10 | 711 | 83 |

TABLE 1-1-continued

Mass ratio: Halogenated carbonate/Alkylbenzene

| | Positive electrode active material | Negative electrode | Halogenated carbonate or unsaturated carbonate | Content [% by mass] | Alkyl-benzene | Content [% by mass] | Mass ratio | Operating time of safety valve [h] | Cycle retention rate [%] |
|---|---|---|---|---|---|---|---|---|---|
| Comparative Example 1-1 | $LiNi_{0.5}Co_{0.2}Mn_{0.3}O_2$ | Artificial graphite | — | — | — | — | — | 354 | 70 |
| Comparative Example 1-2 | | | — | — | Compound A | 1 | — | 360 | 68 |
| Comparative Example 1-3 | | | FEC | 5 | — | — | — | 320 | 80 |
| Comparative Example 1-4 | | | | | Compound A | 10 | 0.5 | 395 | 65 |
| Comparative Example 1-5 | | | | 80 | Compound A | 1 | 80 | 274 | 63 |
| Comparative Example 1-6 | | | | 5 | CHB | 1 | 5 | 389 | 64 |
| Comparative Example 1-7 | | | VC | 5 | Compound A | 1 | 5 | 310 | 68 |
| Comparative Example 1-8 | $LiCoO_2$ | Artificial graphite | — | — | — | — | — | 630 | 74 |
| Comparative Example 1-9 | | | | — | Compound A | 1 | — | 634 | 73 |
| Comparative Example 1-10 | | | FEC | 5 | — | — | — | 625 | 82 |
| Comparative Example 1-11 | | | | | Compound A | 1 | 5 | 632 | 80 |

Mass ratio: Halogenated carbonate/Alkylbenzene or Unsaturated carbonate/Alkylbenzene

TABLE 1-2

| | Mass ratio | Operating time of safety valve [h] |
|---|---|---|
| Example 1-3 | 0.02 | 687 |
| Example 1-2 | 0.1 | 708 |
| Example 1-9 | 0.5 | 716 |
| Example 1-8 | 1 | 725 |
| Example 1-6 | 5 | 727 |
| Example 1-4 | 10 | 720 |
| Example 1-21 | 12.5 | 718 |
| Example 1-12 | 20 | 710 |
| Example 1-11 | 50 | 706 |
| Example 1-19 | 200 | 695 |
| Example 1-26 | 500 | 645 |

Mass ratio: Halogenated carbonate/Alkylbenzene (Evaluation)

As shown in Table 1-1, in Examples 1-1 to 1-28, the lithium nickel complex oxide with a high nickel content ($LiNi_{0.5}Co_{0.2}Mn_{0.3}O_2$) was used as the positive electrode active material. In that case, the content of the halogenated carbonate (FEC) represented by any of the formulae (1) to (2) in the electrolytic solution was regulated to 0.1% by mass or more and not more than 50% by mass, and the content of the alkylbenzene (Compound A) represented by the formula (3) in the electrolytic solution was regulated to 0.1% by mass or more and not more than 5% by mass. According to this, the generation of a gas was sufficiently suppressed, so that the operating time of safety valve was long. Also, the cycle retention rate was favorable.

On the other hand, in Comparative Example 1-1, the electrolytic solution does not contain the halogenated carbonate represented by any of the formulae (1) to (2) and the alkylbenzene represented by the formula (3). In consequence, the generation of a gas was not sufficiently suppressed, so that the operating time of safety valve was short.

In Comparative Example 1-2, though the electrolytic solution contains the alkylbenzene (Compound A) represented by the formula (3), it does not contain the halogenated carbonate represented by any of the formulae (1) to (2). In consequence, the generation of a gas was not sufficiently suppressed, so that the operating time of safety valve was short. In Comparative Example 1-3, though the electrolytic solution contains the halogenated carbonate (FEC) represented by any of the formulae (1) to (2), it does not contain the alkylbenzene represented by the formula (3). In consequence, the generation of a gas was not sufficiently suppressed, so that the operating time of safety valve was short.

In Comparative Example 1-4, though the electrolytic solution contains the halogenated carbonate (FEC) represented by any of the formulae (1) to (2) and the alkylbenzene (Compound A) represented by the formula (3), the content of the alkylbenzene represented by the formula (3) is too large. In consequence, the generation of a gas was not sufficiently suppressed, so that the operating time of safety valve was short. In Comparative Example 1-5, though the electrolytic solution contains the halogenated carbonate (FEC) represented by any of the formulae (1) to (2) and the alkylbenzene (Compound A) represented by the formula (3), the content of the halogenated carbonate represented by any of the formulae (1) to (2) is too large. In consequence, the generation of a gas was not sufficiently suppressed, so that the operating time of safety valve was short.

In Comparative Example 1-6, the electrolytic solution contains the halogenated carbonate (FEC) represented by any of the formulae (1) to (2) and the alkylbenzene. However, the alkylbenzene is cyclohexylbenzene (CHB) which does not have the structure represented by the formula (3). In consequence, the generation of a gas was not sufficiently suppressed, so that the operating time of safety valve was short.

In Comparative Example 1-7, the electrolytic solution contains the unsaturated carbonate (VC) and the alkylbenzene (Compound A) represented by the formula (3). However, in the joint use of the unsaturated carbonate (VC) and the alkylbenzene (Compound A) represented by the formula (3), the generation of a gas was not sufficiently suppressed, so that the operating time of safety valve was short.

In Comparative Examples 1-8 to 1-11, lithium cobaltate ($LiCoO_2$) was used as the positive electrode active material. In that case, the generation of a gas at the time of high temperature storage was not accelerated, and even when the electrolytic solution contained the halogenated carbonate represented by any of the formulae (1) to (2) and the alkylbenzene represented by the formula (3), the operating time of safety valve was substantially the same as that in the case where the electrolytic solution did not contain these materials.

Also, as shown in Table 1-2, it was noted that the mass ratio of the halogenated carbonate represented by any of the formulae (1) to (2) to the alkylbenzene represented by the formula (3) (halogenated carbonate/alkylbenzene) is preferably 0.1 or more and not more than 200, more preferably 1 or more and not more than 50, and especially preferably 1 or more and not more than 12.5.

Example 2-1

Ethylene carbonate (EC), 4-fluoro-1,3-dioxolan-2-one (FEC), dimethyl carbonate (DMC), Compound B and $LiPF_6$ were mixed in a proportion of 15/5/64/1/15 in terms of a mass ratio (EC/FEC/DMC/Compound B/$LiPF_6$), thereby preparing an electrolytic solution. A secondary battery of Example 2-1 was fabricated in the same manner as in Example 1-1, except for the foregoing point.

Example 2-2

Ethylene carbonate (EC), 4-fluoro-1,3-dioxolan-2-one (FEC), dimethyl carbonate (DMC), Compound C and $LiPF_6$ were mixed in a proportion of 15/5/64/1/15 in terms of a mass ratio (EC/FEC/DMC/Compound C/$LiPF_6$), thereby preparing an electrolytic solution. A secondary battery of Example 2-2 was fabricated in the same manner as in Example 1-1, except for the foregoing point.

Example 2-3

Ethylene carbonate (EC), 4-fluoro-1,3-dioxolan-2-one (FEC), dimethyl carbonate (DMC), Compound D and $LiPF_6$ were mixed in a proportion of 15/5/64/1/15 in terms of a mass ratio (EC/FEC/DMC/Compound D/$LiPF_6$), thereby preparing an electrolytic solution. A secondary battery of Example 2-3 was fabricated in the same manner as in Example 1-1, except for the foregoing point.

Examples 2-4 to 2-7

On the occasion of preparing an electrolytic solution, 4,5-difluoro-1,3-dioxolan-2-one (DFEC) was mixed in place of 4-fluoro-1,3-dioxolan-2-one (FEC). Secondary batteries of Examples 2-4 to 2-7 were fabricated in the same manners as in Example 1-16 and Examples 2-1 to 2-3, respectively, except for the foregoing point.

Examples 2-8 to 2-11

On the occasion of preparing an electrolytic solution, fluoromethyl methyl carbonate was mixed in place of 4-fluoro-1,3-dioxolan-2-one (FEC). Secondary batteries of Examples 2-8 to 2-11 were fabricated in the same manners as in Example 1-16 and Examples 2-1 to 2-3, respectively, except for the foregoing point.

Examples 2-12 to 2-15

On the occasion of preparing an electrolytic solution, bis(fluoromethyl) carbonate was mixed in place of 4-fluoro-1,3-dioxolan-2-one (FEC). Secondary batteries of Examples 2-12 to 2-15 were fabricated in the same manners as in Example 1-16 and Examples 2-1 to 2-3, respectively, except for the foregoing point.

Comparative Example 2-1

Ethylene carbonate (EC), dimethyl carbonate (DMC), Compound B and $LiPF_6$ were mixed in a proportion of 20/64/1/15 in terms of a mass ratio (EC/DMC/Compound B/$LiPF_6$), thereby preparing an electrolytic solution. A secondary battery of Comparative Example 2-1 was fabricated in the same manner as in Example 2-1, except for the foregoing point.

Comparative Example 2-2

Ethylene carbonate (EC), dimethyl carbonate (DMC), Compound C and $LiPF_6$ were mixed in a proportion of 20/64/1/15 in terms of a mass ratio (EC/DMC/Compound C/$LiPF_6$), thereby preparing an electrolytic solution. A secondary battery of Comparative Example 2-2 was fabricated in the same manner as in Example 2-1, except for the foregoing point.

Comparative Example 2-3

Ethylene carbonate (EC), dimethyl carbonate (DMC), Compound D and $LiPF_6$ were mixed in a proportion of 20/64/1/15 in terms of a mass ratio (EC/DMC/Compound D/$LiPF_6$), thereby preparing an electrolytic solution. A secondary battery of Comparative Example 2-3 was fabricated in the same manner as in Example 2-1, except for the foregoing point.

Comparative Example 2-4

Ethylene carbonate (EC), 4,5-difluoro-1,3-dioxolan-2-one (DFEC), dimethyl carbonate (DMC) and $LiPF_6$ were mixed in a proportion of 15/5/65/15 in terms of a mass ratio (EC/DFEC/DMC/$LiPF_6$), thereby preparing an electrolytic solution. A secondary battery of Comparative Example 2-4 was fabricated in the same manner as in Example 2-1, except for the foregoing point.

Comparative Example 2-5

Ethylene carbonate (EC), fluoromethyl methyl carbonate, dimethyl carbonate (DMC) and $LiPF_6$ were mixed in a proportion of 20/5/60/15 in terms of a mass ratio (EC/fluoromethyl methyl carbonate/DMC/$LiPF_6$), thereby preparing an electrolytic solution. A secondary battery of Comparative Example 2-5 was fabricated in the same manner as in Example 2-1, except for the foregoing point.

Comparative Example 2-6

Ethylene carbonate (EC), bis(fluoromethyl) carbonate, dimethyl carbonate (DMC) and $LiPF_6$ were mixed in a proportion of 20/5/60/15 in terms of a mass ratio (EC/bis (fluoromethyl) carbonate/DMC/LiPF$_6$), thereby preparing an electrolytic solution. A secondary battery of Comparative Example 2-6 was fabricated in the same manner as in Example 2-1, except for the foregoing point.

With respect to the secondary batteries of Examples 2-1 to 2-15 and Comparative Examples 2-1 to 2-6, the operating time of safety valve and cycle characteristics were determined in the same manner as in Example 1-1. Measurement results are shown in Table 2. For the purpose of making Example 1-16, Comparative Example 1-1, Comparative Example 1-2 and Comparative Example 1-3 subjective to the evaluation, too, the measurement results of Example 1-16, Comparative Example 1-1, Comparative Example 1-2 and Comparative Example 1-3 are also shown in Table 2.

solution contains only either one of the halogenated carbonate represented by any of the formulae (1) to (2) or the alkylbenzene represented by the formula (3), or does not contain the both. In consequence, the generation of a gas was not sufficiently suppressed, so that the operating time of safety valve was short.

Examples 3-1 to 3-3

A mixture of 50 parts by mass of a lithium nickel cobalt manganese complex oxide (LiNi$_{0.5}$Co$_{0.2}$Mn$_{0.3}$O$_2$) and 41 parts by mass of a lithium cobalt complex oxide (LiCoO$_2$)

TABLE 2

| | Positive electrode active material | Negative electrode | Halogenated carbonate | Content [% by mass] | Alkyl-benzene | Content [% by mass] | Mass ratio | Operating time of safety valve [h] | Cycle retention rate [%] |
|---|---|---|---|---|---|---|---|---|---|
| Example 1-16 | LiNi$_{0.5}$Co$_{0.2}$Mn$_{0.3}$O$_2$ | Artificial graphite | FEC | 5 | Compound A | 1 | 5 | 728 | 88 |
| Example 2-1 | | | | 5 | Compound B | 1 | 5 | 713 | 87 |
| Example 2-2 | | | | 5 | Compound C | 1 | 5 | 712 | 87 |
| Example 2-3 | | | | 5 | Compound D | 1 | 5 | 710 | 87 |
| Example 2-4 | | | DFEC | 5 | Compound A | 1 | 5 | 721 | 88 |
| Example 2-5 | | | | 5 | Compound B | 1 | 5 | 712 | 88 |
| Example 2-6 | | | | 5 | Compound C | 1 | 5 | 711 | 87 |
| Example 2-7 | | | | 5 | Compound D | 1 | 5 | 710 | 87 |
| Example 2-8 | | | Fluoromethyl methyl carbonate | 5 | Compound A | 1 | 5 | 722 | 81 |
| Example 2-9 | | | | 5 | Compound B | 1 | 5 | 715 | 81 |
| Example 2-10 | | | | 5 | Compound C | 1 | 5 | 713 | 80 |
| Example 2-11 | | | | 5 | Compound D | 1 | 5 | 714 | 80 |
| Example 2-12 | | | Bis(fluoromethyl) carbonate | 5 | Compound A | 1 | 5 | 724 | 82 |
| Example 2-13 | | | | 5 | Compound B | 1 | 5 | 718 | 81 |
| Example 2-14 | | | | 5 | Compound C | 1 | 5 | 715 | 81 |
| Example 2-15 | | | | 5 | Compound D | 1 | 5 | 715 | 81 |
| Comparative Example 1-1 | LiNi$_{0.5}$Co$_{0.2}$Mn$_{0.3}$O$_2$ | Artificial graphite | — | — | — | — | — | 354 | 70 |
| Comparative Example 1-2 | | | — | — | Compound A | 1 | 0 | 360 | 68 |
| Comparative Example 2-1 | | | — | — | Compound B | 1 | 0 | 362 | 66 |
| Comparative Example 2-2 | | | — | — | Compound C | 1 | 0 | 361 | 66 |
| Comparative Example 2-3 | | | — | — | Compound D | 1 | 0 | 363 | 65 |
| Comparative Example 1-3 | | | FEC | 5 | — | — | — | 320 | 80 |
| Comparative Example 2-4 | | | DFEC | 5 | — | — | — | 312 | 81 |
| Comparative Example 2-5 | | | Fluoromethyl methyl carbonate | 5 | — | — | — | 325 | 75 |
| Comparative Example 2-6 | | | Bis(fluoromethyl) carbonate | 5 | — | — | — | 330 | 79 |

Mass ratio: Halogenated carbonate/Alkylbenzene (Evaluation)

As shown in Table 2, in Example 1-16 and Examples 2-1 to 2-15, the lithium nickel complex oxide with a high nickel content (LiNi$_{0.5}$Co$_{0.2}$Mn$_{0.3}$O$_2$) was used as the positive electrode active material. In that case, the electrolytic solution was allowed to contain 5% by mass of the halogenated carbonate represented by any of the formulae (1) to (2) (fluoromethyl methyl carbonate, bis(fluoromethyl) carbonate, FEC or DFEC) and 1% by mass of the alkylbenzene represented by the formula (3) (Compound A, Compound B, Compound C or Compound D). According to this, the generation of a gas was sufficiently suppressed, so that the operating time of safety valve was long. Also, the cycle retention rate was favorable.

On the other hand, in Comparative Examples 1-1 to 1-3 and Comparative Examples 2-1 to 2-6, the electrolytic was used as the positive electrode active material. Secondary batteries of Examples 3-1 to 3-3 were fabricated in the same manners as in Examples 1-1 to 1-3, respectively, except for the foregoing point.

Examples 3-4 to 3-6

A mixture of 50 parts by mass of a lithium nickel cobalt manganese complex oxide (LiNi$_{0.5}$Co$_{0.2}$Mn$_{0.3}$O$_2$) and 41 parts by mass of a lithium cobalt complex oxide (LiCoO$_2$) was used as the positive electrode active material. Secondary batteries of Examples 3-4 to 3-6 were fabricated in the same manners as in Example 1-4, Example 1-8 and Example 1-9, respectively, except for the foregoing point.

Examples 3-7 to 3-9

A mixture of 50 parts by mass of a lithium nickel cobalt manganese complex oxide ($LiNi_{0.5}Co_{0.2}Mn_{0.3}O_2$) and 41 parts by mass of a lithium cobalt complex oxide ($LiCoO_2$) was used as the positive electrode active material. Secondary batteries of Examples 3-7 to 3-9 were fabricated in the same manners as in Example 1-11, Example 1-16 and Example 1-18, respectively, except for the foregoing point.

Examples 3-10 to 3-12

A mixture of 50 parts by mass of a lithium nickel cobalt manganese complex oxide ($LiNi_{0.5}Co_{0.2}Mn_{0.3}O_2$) and 41 parts by mass of a lithium cobalt complex oxide ($LiCoO_2$) was used as the positive electrode active material. Secondary batteries of Examples 3-10 to 3-12 were fabricated in the same manners as in Examples 1-19 to 1-20 and Example 1-25, respectively, except for the foregoing point.

Examples 3-13 to 3-15

A mixture of 50 parts by mass of a lithium nickel cobalt manganese complex oxide ($LiNi_{0.5}Co_{0.2}Mn_{0.3}O_2$) and 41 parts by mass of a lithium cobalt complex oxide ($LiCoO_2$) was used as the positive electrode active material. Secondary batteries of Examples 3-13 to 3-15 were fabricated in the same manners as in Examples 1-26 to 1-28, respectively, except for the foregoing point.

Comparative Examples 3-1 to 3-6

A mixture of 50 parts by mass of a lithium nickel cobalt manganese complex oxide ($LiNi_{0.5}Co_{0.2}Mn_{0.3}O_2$) and 41 parts by mass of a lithium cobalt complex oxide ($LiCoO_2$) was used as the positive electrode active material. Secondary batteries of Comparative Examples 3-1 to 3-6 were fabricated in the same manners as in Comparative Examples 1-1 to 1-5 and Comparative Example 1-7, respectively, except for the foregoing point.

With respect to the secondary batteries of Examples 3-1 to 3-15 and Comparative Examples 3-1 to 3-6, the operating time of safety valve and cycle characteristics were determined in the same manner as in Example 1-1. Measurement results are shown in Table 3. For the purpose of making Comparative Example 1-8 and Comparative Example 1-11 subjective to the evaluation, too, the measurement results of Comparative Example 1-8 and Comparative Example 1-11 are also shown in Table 3.

TABLE 3

| | Positive electrode active material | Negative electrode | Halogenated carbonate | Content [% by mass] | Alkyl-benzene | Content [% by mass] | Mass ratio | Operating time of safety valve [h] | Cycle retention rate [%] |
|---|---|---|---|---|---|---|---|---|---|
| Example 3-1 | $LiN_{0.5}Co_{0.2}Mn_{0.3}O_2$ + | Artificial | FEC | 0.1 | Compound A | 0.1 | 1 | 722 | 85 |
| Example 3-2 | $LiCoO_2$ | graphite | | | | 1 | 0.1 | 702 | 84 |
| Example 3-3 | (50/41) | | | | | 5 | 0.02 | 674 | 83 |
| Example 3-4 | | | | 1 | | 0.1 | 10 | 727 | 87 |
| Example 3-5 | | | | | | 1 | 1 | 729 | 87 |
| Example 3-6 | | | | | | 5 | 0.2 | 704 | 85 |
| Example 3-7 | | | | 5 | | 0.1 | 50 | 707 | 87 |
| Example 3-8 | | | | | | 1 | 5 | 730 | 87 |
| Example 3-9 | | | | | | 5 | 1 | 729 | 87 |
| Example 3-10 | | | | 20 | | 0.1 | 200 | 684 | 86 |
| Example 3-11 | | | | | | 1 | 20 | 708 | 86 |
| Example 3-12 | | | | | | 5 | 4 | 728 | 86 |
| Example 3-13 | | | | 50 | | 0.1 | 500 | 648 | 84 |
| Example 3-14 | | | | | | 1 | 50 | 704 | 83 |
| Example 3-15 | | | | | | 5 | 10 | 723 | 83 |
| Comparative Example 3-1 | $LiN_{0.5}Co_{0.2}Mn_{0.3}O_2$ + | Artificial | — | — | — | — | — | 526 | 74 |
| Comparative Example 3-2 | $LiCoO_2$ | graphite | — | — | Compound A | 1 | — | 532 | 71 |
| Comparative Example 3-3 | (50/41) | | FEC | 5 | — | — | — | 503 | 81 |
| Comparative Example 3-4 | | | | | Compound A | 10 | 0.5 | 552 | 68 |
| Comparative Example 3-5 | | | | 80 | Compound A | 1 | 80 | 544 | 66 |
| Comparative Example 3-6 | | | VC | 5 | Compound A | 1 | 5 | 468 | 70 |
| Comparative Example 1-8 | $LiCoO2$ | | — | — | — | — | — | 630 | 74 |
| Comparative Example 1-11 | | | FEC | 5 | Compound A | 1 | 5 | 632 | 80 |

Mass ratio: Halogenated carbonate/Alkylbenzene or Unsaturated carbonate/Alkylbenzene (Evaluation)

As shown in Table 3, in Examples 3-1 to 3-15, a mixture of the lithium nickel complex oxide with a high nickel content (LiNi$_{0.5}$Co$_{0.2}$Mn$_{0.3}$O$_2$) and lithium cobaltate (Li-CoO$_2$) was used as the positive electrode active material. In that case, the content of the halogenated carbonate (FEC) represented by any of the formulae (1) to (2) in the electrolytic solution was regulated to 0.1% by mass or more and not more than 50% by mass, and the content of the alkylbenzene (Compound A) represented by the formula (3) in the electrolytic solution was regulated to 0.1% by mass or more and not more than 5% by mass. According to this, the generation of a gas was sufficiently suppressed, so that the operating time of safety valve was long. Also, the cycle retention rate was favorable.

On the other hand, in Comparative Examples 3-1 to 3-6, the electrolytic solution contains only either one of the halogenated carbonate represented by any of the formulae (1) to (2) or the alkylbenzene represented by the formula (3), or does not contain the both. In consequence, the generation of a gas was not sufficiently suppressed, so that the operating time of safety valve was short.

Examples 4-1 to 4-15 and Comparative Examples 4-1 to 4-6

A mixture of 30 parts by mass of a lithium nickel cobalt manganese complex oxide (LiNi$_{0.5}$Co$_{0.2}$Mn$_{0.3}$O$_2$) and 61 parts by mass of a lithium cobalt complex oxide (LiCoO$_2$) was used as the positive electrode active material. Secondary batteries of Examples 4-1 to 4-15 and Comparative Examples 4-1 to 4-6 were fabricated in the same manners as in Examples 3-1 to 3-15 and Comparative Examples 3-1 to 3-6, respectively, except for the foregoing point.

With respect to the secondary batteries of 4-1 to 4-15 and Comparative Examples 4-1 to 4-6, the operating time of safety valve and cycle characteristics were determined in the same manner as in Example 1-1. Measurement results are shown in Table 4. For the purpose of making Comparative Example 1-8 and Comparative Example 1-11 subjective to the evaluation, too, the measurement results of Comparative Example 1-8 and Comparative Example 1-11 are also shown in Table 4.

TABLE 4

|  | Positive electrode active material | Negative electrode | Halogenated carbonate | Content [% by mass] | Alkyl-benzene | Content [% by mass] | Mass ratio | Operating time of safety valve [h] | Cycle retention rate [%] |
|---|---|---|---|---|---|---|---|---|---|
| Example 4-1 | LiN$_{0.5}$Co$_{0.2}$Mn$_{0.3}$O$_2$ + LiCoO$_2$ (30/61) | Artificial graphite | FEC | 0.1 | Compound A | 0.1 | 1 | 721 | 86 |
| Example 4-2 |  |  |  |  |  | 1 | 0.1 | 712 | 85 |
| Example 4-3 |  |  |  |  |  | 5 | 0.02 | 684 | 83 |
| Example 4-4 |  |  |  | 1 |  | 0.1 | 10 | 734 | 87 |
| Example 4-5 |  |  |  |  |  | 1 | 1 | 738 | 87 |
| Example 4-6 |  |  |  |  |  | 5 | 0.2 | 716 | 85 |
| Example 4-7 |  |  |  | 5 |  | 0.1 | 50 | 719 | 87 |
| Example 4-8 |  |  |  |  |  | 1 | 5 | 739 | 87 |
| Example 4-9 |  |  |  |  |  | 5 | 1 | 736 | 87 |
| Example 4-10 |  |  |  | 20 |  | 0.1 | 200 | 694 | 87 |
| Example 4-11 |  |  |  |  |  | 1 | 20 | 718 | 86 |
| Example 4-12 |  |  |  |  |  | 5 | 4 | 734 | 86 |
| Example 4-13 |  |  |  | 50 |  | 0.1 | 500 | 658 | 84 |
| Example 4-14 |  |  |  |  |  | 1 | 50 | 711 | 83 |
| Example 4-15 |  |  |  |  |  | 5 | 10 | 720 | 83 |
| Comparative Example 4-1 | LiN$_{0.5}$Co$_{0.2}$Mn$_{0.3}$O$_2$ + LiCoO$_2$ (30/61) | Artificial graphite | — | — | — | — | — | 578 | 78 |
| Comparative Example 4-2 |  |  | — | — | Compound A | 1 | — | 581 | 75 |
| Comparative Example 4-3 |  |  | FEC | 5 | — | — | — | 543 | 82 |
| Comparative Example 4-4 |  |  |  |  | Compound A | 10 | 0.5 | 607 | 70 |
| Comparative Example 4-5 |  |  |  | 80 | Compound A | 1 | 80 | 594 | 67 |
| Comparative Example 4-6 |  |  | VC | 5 | Compound A | 1 | 5 | 510 | 70 |
| Comparative Example 1-8 | LiCoO$_2$ | Artificial graphite | — | — | — | — | — | 630 | 74 |
| Comparative Example 1-11 |  |  | FEC | 5 | Compound A | 1 | 5 | 632 | 80 |

Mass ratio: Halogenated carbonate/Alkylbenzene or Unsaturated carbonate/Alkylbenzene (Evaluation)

As shown in Table 4, in Examples 4-1 to 4-15, a mixture of the lithium nickel complex oxide with a high nickel content (LiNi$_{0.5}$Co$_{0.2}$Mn$_{0.3}$O$_2$) and lithium cobaltate (LiCoO$_2$) was used as the positive electrode active material. In that case, the content of the halogenated carbonate (FEC) represented by any of the formulae (1) to (2) in the electrolytic solution was regulated to 0.1% by mass or more and not more than 50% by mass, and the content of the alkylbenzene (Compound A) represented by the formula (3) in the electrolytic solution was regulated to 0.1% by mass or more and not more than 5% by mass. According to this, the generation of a gas was sufficiently suppressed, so that the operating time of safety valve was long. Also, the cycle retention rate was favorable.

On the other hand, in Comparative Examples 4-1 to 4-6, the electrolytic solution contains only either one of the halogenated carbonate represented by any of the formulae (1) to (2) or the alkylbenzene represented by the formula (3), or does not contain the both. In consequence, the generation of a gas was not sufficiently suppressed, so that the operating time of safety valve was short.

In Examples 4-1 to 4-15, a mixture of the lithium nickel complex oxide with a high nickel content (LiNi$_{0.5}$Co$_{0.2}$Mn$_{0.3}$O$_2$) and lithium cobaltate (LiCoO$_2$) is used as the positive electrode active material. Then, a mixing ratio thereof is set up at 30/61 (mass ratio), thereby making the mixing ratio of the lithium nickel complex oxide with a high nickel content (LiNi$_{0.5}$Co$_{0.2}$Mn$_{0.3}$O$_2$) low. In that case, as compared with the case where a positive electrode active material having a high mixing ratio of the lithium nickel complex oxide with a high nickel content (LiNi$_{0.5}$Co$_{0.2}$Mn$_{0.3}$O$_2$) is used (for example, Examples 3-1 to 3-15), the generation of a gas at the time of high temperature storage is not accelerated. In consequence, the degree of effects to be brought by allowing the electrolytic solution to contain the halogenated carbonate represented by any of the formulae (1) to (2) and the alkylbenzene represented by the formula (3) was smaller than the degree of effects to be brought in the case of using, as the positive electrode active material, a positive electrode active material having a high mixing ratio of the lithium nickel complex oxide with a high nickel content ($LiNi_{0.5}Co_{0.2}Mn_{0.3}O_2$) as in Examples 3-1 to 3-15.

Examples 5-1 to 5-15 and Comparative Examples 5-1 to 5-6

A mixture of 70 parts by mass of a lithium nickel cobalt manganese complex oxide ($LiNi_{0.5}Co_{0.2}Mn_{0.3}O_2$) and 21 parts by mass of a lithium manganese complex oxide ($Li_{1.1}Mn_2O_4$) was used as the positive electrode active material. Secondary batteries of Examples 5-1 to 5-15 and Comparative Examples 5-1 to 5-6 were fabricated in the same manners as in Examples 3-1 to 3-15 and Comparative Examples 3-1 to 3-6, respectively, except for the foregoing point.

With respect to the secondary batteries of 5-1 to 5-15 and Comparative Examples 5-1 to 5-6, the operating time of safety valve and cycle characteristics were determined in the same manner as in Example 1-1. Measurement results are shown in Table 5. For the purpose of making Comparative Example 1-8 and Comparative Example 1-11 subjective to the evaluation, too, the measurement results of Comparative Example 1-8 and Comparative Example 1-11 are also shown in Table 5.

(Evaluation)

As shown in Table 5, in Examples 5-1 to 5-15, a mixture of the lithium nickel complex oxide with a high nickel content ($LiNi_{0.5}Co_{0.2}Mn_{0.3}O_2$) and lithium manganate ($Li_{1.1}Mn_2O_4$) was used as the positive electrode active material. In that case, the content of the halogenated carbonate (FEC) represented by any of the formulae (1) to (2) in the electrolytic solution was regulated to 0.1% by mass or more and not more than 50% by mass, and the content of the alkylbenzene (Compound A) represented by the formula (3) in the electrolytic solution was regulated to 0.1% by mass or more and not more than 5% by mass. According to this, the generation of a gas was sufficiently suppressed, so that the operating time of safety valve was long. Also, the cycle retention rate was favorable.

On the other hand, in Comparative Examples 5-1 to 5-6, the electrolytic solution contains only either one of the halogenated carbonate represented by any of the formulae (1) to (2) or the alkylbenzene represented by the formula (3), or does not contain the both. In consequence, the generation of a gas was not sufficiently suppressed, so that the operating time of safety valve was short.

Examples 6-1 to 6-15 and Comparative Examples 1-1 to 6-6

A mixture of 70 parts by mass of a lithium nickel cobalt aluminum complex oxide ($LiNi_{0.82}Co_{0.15}Al_{0.03}O_2$) and 21 parts by mass of a lithium manganese complex oxide ($Li_{1.1}Mn_2O_4$) was used as the positive electrode active material. Secondary batteries of Examples 6-1 to 6-15 and Comparative Examples 6-1 to 6-6 were fabricated in the

TABLE 5

| | Positive electrode active material | Negative electrode | Halogenated carbonate | Content [% by mass] | Alkyl-benzene | Content [% by mass] | Mass ratio | Operating time of safety valve [h] | Cycle retention rate [%] |
|---|---|---|---|---|---|---|---|---|---|
| Example 5-1 | $LiN_{0.5}Co_{0.2}Mn_{0.3}O_2$ + | Artificial | FEC | 0.1 | Compound A | 0.1 | 1 | 696 | 88 |
| Example 5-2 | $Li_{1.1}Mn_2O_4$ | graphite | | | | 1 | 0.1 | 678 | 85 |
| Example 5-3 | (70/21) | | | | | 5 | 0.02 | 660 | 85 |
| Example 5-4 | | | | 1 | | 0.1 | 10 | 708 | 88 |
| Example 5-5 | | | | | | 1 | 1 | 709 | 87 |
| Example 5-6 | | | | | | 5 | 0.2 | 681 | 85 |
| Example 5-7 | | | | 5 | | 0.1 | 50 | 688 | 88 |
| Example 5-8 | | | | | | 1 | 5 | 710 | 88 |
| Example 5-9 | | | | | | 5 | 1 | 705 | 88 |
| Example 5-10 | | | | 20 | | 0.1 | 200 | 670 | 89 |
| Example 5-11 | | | | | | 1 | 20 | 689 | 88 |
| Example 5-12 | | | | | | 5 | 4 | 704 | 88 |
| Example 5-13 | | | | 50 | | 0.1 | 500 | 643 | 87 |
| Example 5-14 | | | | | | 1 | 50 | 681 | 85 |
| Example 5-15 | | | | | | 5 | 10 | 695 | 85 |
| Comparative Example 5-1 | $LiN_{0.5}Co_{0.2}Mn_{0.3}O_2$ + $Li_{1.1}Mn_2O_4$ | Artificial graphite | — | — | — | — | — | 463 | 76 |
| Comparative Example 5-2 | (70/21) | | — | — | Compound A | 1 | — | 471 | 73 |
| Comparative Example 5-3 | | | FEC | 5 | — | — | — | 432 | 84 |
| Comparative Example 5-4 | | | | | Compound A | 10 | 0.5 | 404 | 67 |
| Comparative Example 5-5 | | | | 80 | Compound A | 1 | 80 | 494 | 62 |
| Comparative Example 5-6 | | | VC | 5 | Compound A | 1 | 5 | 398 | 74 |
| Comparative Example 1-8 | $LiCoO_2$ | Artificial graphite | — | — | — | — | — | 630 | 74 |
| Comparative Example 1-11 | | | FEC | 5 | Compound A | 1 | 5 | 632 | 80 |

Mass ratio: Halogenated carbonate/Alkylbenzene or Unsaturated carbonate/Alkylbenzene same manners as in Examples 3-1 to 3-15 and Comparative Examples 3-1 to 3-6, respectively, except for the foregoing point.

With respect to the secondary batteries of 6-1 to 6-15 and Comparative Examples 6-1 to 6-6, the operating time of safety valve and cycle characteristics were determined in the same manner as in Example 1-1. Measurement results are shown in Table 6. For the purpose of making Comparative Example 1-8 and Comparative Example 1-11 subjective to the evaluation, too, the measurement results of Comparative Example 1-8 and Comparative Example 1-11 are also shown in Table 6.

On the other hand, in Comparative Examples 6-1 to 6-6, the electrolytic solution contains only either one of the halogenated carbonate represented by any of the formulae (1) to (2) or the alkylbenzene represented by the formula (3), or does not contain the both. In consequence, the generation of a gas was not sufficiently suppressed, so that the operating time of safety valve was short.

Examples 7-1 to 7-15 and Comparative Examples 7-1 to 7-6

A lithium nickel cobalt manganese complex oxide ($LiNi_{1/3}Co_{1/3}Mn_{1/3}O_2$) was used as the positive electrode

TABLE 6

| | Positive electrode active material | Negative electrode | Halogenated carbonate | Content [% by mass] | Alkyl-benzene | Content [% by mass] | Mass ratio | Operating time of safety valve [h] | Cycle retention rate [%] |
|---|---|---|---|---|---|---|---|---|---|
| Example 6-1 | $LiNi_{0.82}Co_{0.15}Al_{0.03}O_2$ + | Artificial graphite | FEC | 0.1 | Compound A | 0.1 | 1 | 713 | 86 |
| Example 6-2 | $Li_{1.1}Mn_2O_4$ | | | | | 1 | 0.1 | 698 | 84 |
| Example 6-3 | (70/21) | | | | | 5 | 0.02 | 663 | 82 |
| Example 6-4 | | | | 1 | | 0.1 | 10 | 720 | 87 |
| Example 6-5 | | | | | | 1 | 1 | 723 | 87 |
| Example 6-6 | | | | | | 5 | 0.2 | 701 | 85 |
| Example 6-7 | | | | 5 | | 0.1 | 50 | 703 | 87 |
| Example 6-8 | | | | | | 1 | 5 | 725 | 86 |
| Example 6-9 | | | | | | 5 | 1 | 724 | 85 |
| Example 6-10 | | | | 20 | | 0.1 | 200 | 672 | 87 |
| Example 6-11 | | | | | | 1 | 20 | 710 | 85 |
| Example 6-12 | | | | | | 5 | 4 | 723 | 84 |
| Example 6-13 | | | | 50 | | 0.1 | 500 | 654 | 84 |
| Example 6-14 | | | | | | 1 | 50 | 703 | 83 |
| Example 6-15 | | | | | | 5 | 10 | 714 | 82 |
| Comparative Example 6-1 | $LiNi_{0.82}Co_{0.15}Al_{0.03}O_2$ + $Li_{1.1}Mn_2O_4$ | Artificial graphite | — | — | — | — | — | 320 | 74 |
| Comparative Example 6-2 | (70/21) | | — | — | Compound A | 1 | — | 325 | 72 |
| Comparative Example 6-3 | | | FEC | 5 | — | — | — | 294 | 81 |
| Comparative Example 6-4 | | | | | Compound A | 10 | 0.5 | 344 | 67 |
| Comparative Example 6-5 | | | | 80 | Compound A | 1 | 80 | 253 | 65 |
| Comparative Example 6-6 | | | VC | 5 | Compound A | 1 | 5 | 268 | 69 |
| Comparative Example 1-8 | $LiCoO_2$ | Artificial graphite | — | — | — | — | — | 630 | 74 |
| Comparative Example 1-11 | | | FEC | 5 | Compound A | 1 | 5 | 632 | 80 |

Mass ratio: Halogenated carbonate/Alkylbenzene or Unsaturated carbonate/Alkylbenzene (Evaluation)

As shown in Table 6, in Examples 6-1 to 6-15, a mixture of the lithium nickel complex oxide with a high nickel content ($LiNi_{0.82}Co_{0.15}Al_{0.03}O_2$) and lithium manganate ($Li_{1.1}Mn_2O_4$) was used as the positive electrode active material. In that case, the content of the halogenated carbonate (FEC) represented by any of the formulae (1) to (2) in the electrolytic solution was regulated to 0.1% by mass or more and not more than 50% by mass, and the content of the alkylbenzene (Compound A) represented by the formula (3) in the electrolytic solution was regulated to 0.1% by mass or more and not more than 5% by mass. According to this, the generation of a gas was sufficiently suppressed, so that the operating time of safety valve was long. Also, the cycle retention rate was favorable.

active material. Secondary batteries of Examples 7-1 to 7-15 and Comparative Examples 7-1 to 7-6 were fabricated in the same manners as in Examples 3-1 to 3-15 and Comparative Examples 3-1 to 3-6, respectively, except for the foregoing point.

With respect to the secondary batteries of 7-1 to 7-15 and Comparative Examples 7-1 to 7-6, the operating time of safety valve and cycle characteristics were determined in the same manner as in Example 1-1. Measurement results are shown in Table 7. For the purpose of making Comparative Example 1-8 and Comparative Example 1-11 subjective to the evaluation, too, the measurement results of Comparative Example 1-8 and Comparative Example 1-11 are also shown in Table 7.

TABLE 7

| | Positive electrode active material | Negative electrode | Halogenated carbonate | Content [% by mass] | Alkyl-benzene | Content [% by mass] | Mass ratio | Operating time of safety valve [h] | Cycle retention rate [%] |
|---|---|---|---|---|---|---|---|---|---|
| Example 7-1 | $LiNi_{1/3}Co_{1/3}Mn_{1/3}O_2$ | Artificial graphite | FEC | 0.1 | Compound A | 0.1 | 1 | 651 | 85 |
| Example 7-2 | | | | | | 1 | 0.1 | 631 | 85 |
| Example 7-3 | | | | | | 5 | 0.02 | 612 | 84 |
| Example 7-4 | | | | 1 | | 0.1 | 10 | 654 | 87 |
| Example 7-5 | | | | | | 1 | 1 | 654 | 86 |
| Example 7-6 | | | | | | 5 | 0.2 | 633 | 84 |
| Example 7-7 | | | | 5 | | 0.1 | 50 | 634 | 87 |
| Example 7-8 | | | | | | 1 | 5 | 656 | 87 |
| Example 7-9 | | | | | | 5 | 1 | 655 | 86 |
| Example 7-10 | | | | 20 | | 0.1 | 200 | 615 | 88 |
| Example 7-11 | | | | | | 1 | 20 | 636 | 86 |
| Example 7-12 | | | | | | 5 | 4 | 654 | 86 |
| Example 7-13 | | | | 50 | | 0.1 | 500 | 611 | 85 |
| Example 7-14 | | | | | | 1 | 50 | 631 | 85 |
| Example 7-15 | | | | | | 5 | 10 | 650 | 84 |
| Comparative Example 7-1 | $LiNi_{1/3}Co_{1/3}Mn_{1/3}O_2$ | Artificial graphite | — | — | — | — | — | 598 | 78 |
| Comparative Example 7-2 | | | — | | Compound A | 1 | — | 602 | 76 |
| Comparative Example 7-3 | | | FEC | 5 | — | — | — | 555 | 83 |
| Comparative Example 7-4 | | | | | Compound A | 10 | 0.5 | 605 | 69 |
| Comparative Example 7-5 | | | | 80 | Compound A | 1 | 80 | 600 | 63 |
| Comparative Example 7-6 | | | VC | 5 | Compound A | 1 | 5 | 554 | 71 |
| Comparative Example 1-8 | $LiCoO_2$ | Artificial graphite | — | — | — | — | — | 630 | 74 |
| Comparative Example 1-11 | | | FEC | 5 | Compound A | 1 | 5 | 632 | 80 |

Mass ratio: Halogenated carbonate/Alkylbenzene or Unsaturated carbonate/Alkylbenzene (Evaluation)

As shown in Table 7, in Examples 7-1 to 7-15, the lithium nickel cobalt manganese complex oxide ($LiNi_{1/3}Co_{1/3}Mn_{1/3}O_2$) was used as the positive electrode active material. In that case, the content of the halogenated carbonate (FEC) represented by any of the formulae (1) to (2) in the electrolytic solution was regulated to 0.1% by mass or more and not more than 50% by mass, and the content of the alkylbenzene (Compound A) represented by the formula (3) in the electrolytic solution was regulated to 0.1% by mass or more and not more than 5% by mass. According to this, the generation of a gas was sufficiently suppressed, so that the operating time of safety valve was long. Also, the cycle retention rate was favorable.

On the other hand, in Comparative Examples 7-1 to 7-6, the electrolytic solution contains only either one of the halogenated carbonate represented by any of the formulae (1) to (2) or the alkylbenzene represented by the formula (3), or does not contain the both. In consequence, the generation of a gas was not sufficiently suppressed, so that the operating time of safety valve was short.

In Examples 7-1 to 7-15, the lithium nickel complex oxide having a low nickel content ($LiNi_{1/3}Co_{1/3}Mn_{1/3}O_2$) is used as the positive electrode active material. In that case, as compared with the case where a lithium nickel complex oxide with a high nickel content is used as the positive electrode active material, the generation of a gas at the time of high temperature storage is not accelerated. In consequence, the degree of effects to be brought by allowing the electrolytic solution to contain the halogenated carbonate represented by any of the formulae (1) to (2) and the alkylbenzene represented by the formula (3) was smaller than the degree of effects to be brought in the case of using, as the positive electrode active material, a positive electrode active material having a high mixing ratio of the lithium nickel complex oxide with a high nickel content ($LiNi_{0.5}Co_{0.2}Mn_{0.3}O_2$) as in Examples 1-1 to 1-28.

Examples 8-1 to 8-15 and Comparative Examples 8-1 to 8-6

Secondary batteries of Examples 8-1 to 8-15 and Comparative Examples 8-1 to 8-6 were fabricated in the same manners as in Examples 3-1 to 3-15 and Comparative Examples 3-1 to 3-6, except for using a positive electrode active material prepared in the following manner.

First of all, not only a lithium cobaltate powder having an average particle size, as measured by the laser scattering method, of 13 μm was prepared as a complex oxide particle, but a precursor powder prepared by mixing a lithium carbonate ($Li_2CO_3$) powder, a nickel hydroxide ($Ni(OH)_2$) powder and a manganese carbonate ($MnCO_3$) powder in a molar ratio of $Li_2CO_3$ to $Ni(OH)_2$ to $MnCO_3$ of 1.08/1/1 was prepared as a raw material of the coating layer. Subsequently, to 100 parts by mass of this lithium cobaltate powder, the precursor powder was added in an amount of 10 parts by mass as reduced into $Li_{1.08}Ni_{0.5}Mn_{0.5}O_2$; the mixture was stirred and dispersed in 100 parts by mass of pure water at 25° C. over one hour; and after drying under reduced pressure at 70° C., a precursor layer was formed on the surface of the complex oxide particle. Subsequently, the temperature was elevated at a rate of 3° C./min, and the resultant was kept at 800° C. for 3 hours, followed by gradually cooling to form a coating layer. There was thus obtained a positive electrode active material.

The thus prepared positive electrode active material was observed while jointly using a scanning electrode microscope (SEM) and an energy dispersive X-ray fluorescence spectrometer (EDX). As a result, oxide particles containing nickel and manganese and having a particle size of from about 0.1 μm to 5 μm were deposited on the surface of the lithium cobaltate complex oxide particle; and the state where nickel and manganese existed substantially uniformly on the surface of the complex oxide particle was seen. Thus, the positive electrode active material coated with a layer containing nickel and manganese was obtained.

With respect to the secondary batteries of 8-1 to 8-15 and Comparative Examples 8-1 to 8-6, the operating time of safety valve and cycle characteristics were determined in the same manner as in Example 1-1. Measurement results are shown in Table 8. For the purpose of making Comparative Example 1-8 and Comparative Example 1-11 subjective to the evaluation, too, the measurement results of Comparative Example 1-8 and Comparative Example 1-11 are also shown in Table 8.

of a gas was not sufficiently suppressed, so that the operating time of safety valve was short.

Examples 9-1 to 9-16 and Comparative Examples 9-1 to 9-9

The negative electrode 22 was fabricated in the following manner. First of all, a tin/cobalt/indium/titanium alloy powder and a carbon powder were mixed, and an SnCoC-containing material was then synthesized from the mixture by utilizing a mechanochemical reaction. As a result of analysis of a composition of this SnCoC-containing material, a content of tin was 48% by mass, a content of cobalt was 23% by mass, a content of carbon was 20% by mass, and a proportion of cobalt relative to a total sum of tin and cobalt (Co/(Sn+Co)) was 32% by mass.

Next, 80 parts by mass of the SnCoC-containing material powder as a negative electrode active material, 12 parts by

TABLE 8

| | Positive electrode active material | Negative electrode | Halogenated carbonate | Content [% by mass] | Alkyl-benzene | Content [% by mass] | Mass ratio | Operating time of safety valve [h] | Cycle retention rate [%] |
|---|---|---|---|---|---|---|---|---|---|
| Example 8-1 | Coated positive electrode material | Artificial graphite | FEC | 0.1 | Compound A | 0.1 | 1 | 710 | 87 |
| Example 8-2 | | | | | | 1 | 0.1 | 696 | 86 |
| Example 8-3 | | | | | | 5 | 0.02 | 667 | 85 |
| Example 8-4 | | | | 1 | | 0.1 | 10 | 716 | 89 |
| Example 8-5 | | | | | | 1 | 1 | 720 | 89 |
| Example 8-6 | | | | | | 5 | 0.2 | 698 | 87 |
| Example 8-7 | | | | 5 | | 0.1 | 50 | 701 | 89 |
| Example 8-8 | | | | | | 1 | 5 | 724 | 89 |
| Example 8-9 | | | | | | 5 | 1 | 723 | 89 |
| Example 8-10 | | | | 20 | | 0.1 | 200 | 678 | 89 |
| Example 8-11 | | | | | | 1 | 20 | 709 | 88 |
| Example 8-12 | | | | | | 5 | 4 | 720 | 88 |
| Example 8-13 | | | | 50 | | 0.1 | 500 | 629 | 87 |
| Example 8-14 | | | | | | 1 | 50 | 704 | 87 |
| Example 8-15 | | | | | | 5 | 10 | 710 | 86 |
| Comparative Example 8-1 | Coated positive electrode material | Artificial graphite | — | — | — | — | — | 272 | 82 |
| Comparative Example 8-2 | | | — | — | Compound A | 1 | — | 275 | 80 |
| Comparative Example 8-3 | | | FEC | 5 | — | — | — | 236 | 84 |
| Comparative Example 8-4 | | | | | Compound A | 10 | 0.5 | 304 | 72 |
| Comparative Example 8-5 | | | | 80 | Compound A | 1 | 80 | 198 | 68 |
| Comparative Example 8-6 | | | VC | 5 | Compound A | 1 | 5 | 219 | 72 |
| Comparative Example 1-8 | LiCoO$_2$ | Artificial graphite | — | — | — | — | — | 630 | 74 |
| Comparative Example 1-11 | | | FEC | 5 | Compound A | 1 | 5 | 632 | 80 |

Mass ratio: Halogenated carbonate/Alkylbenzene or Unsaturated carbonate/Alkylbenzene (Evaluation)

As shown in Table 8, in Examples 8-1 to 8-15, the coated positive electrode material was used as the positive electrode active material. In that case, the content of the halogenated carbonate (FEC) represented by any of the formulae (1) to (2) in the electrolytic solution was regulated to 0.1% by mass or more and not more than 50% by mass, and the content of the alkylbenzene (Compound A) represented by the formula (3) in the electrolytic solution was regulated to 0.1% by mass or more and not more than 5% by mass. According to this, the generation of a gas was sufficiently suppressed, so that the operating time of safety valve was long. Also, the cycle retention rate was favorable.

On the other hand, in Comparative Examples 8-1 to 8-6, the electrolytic solution contains only either one of the halogenated carbonate represented by any of the formulae (1) to (2) or the alkylbenzene represented by the formula (3), or does not contain the both. In consequence, the generation mass of graphite as a conductive agent and 8 parts by mass of polyvinylidene fluoride as a binder were mixed, and the mixture was dispersed in N-methyl-2-pyrrolidone as a solvent. Finally, the dispersion was coated on the negative electrode collector 22A made of a copper foil (15 μm in thickness), and after drying, the resultant was compression molded to form the negative electrode active material layer 22B.

Secondary batteries of Examples 9-1 to 9-16 and Comparative Examples 9-1 to 9-9 were fabricated in the same manners as in Example 1-16, Examples 2-1 to 2-15, Comparative Examples 1-1 to 1-3 and Comparative Examples 2-1 to 2-6, respectively, except for the foregoing point.

With respect to the secondary batteries of Examples 9-1 to 9-16 and Comparative Examples 9-1 to 9-9, the operating time of safety valve and cycle characteristics were determined in the same manner as in Example 1-1. Measurement results are shown in Table 9.

TABLE 9

| | Positive electrode active material | Negative electrode | Halogenated carbonate | Content [% by mass] | Alkyl-benzene | Content [% by mass] | Mass ratio | Operating time of safety valve [h] | Cycle retention rate [%] |
|---|---|---|---|---|---|---|---|---|---|
| Example 9-1 | $LiN_{0.5}Co_{0.2}Mn_{0.3}O_2$ | SnCoC compound | FEC | 5 | Compound A | 1 | 5 | 637 | 77 |
| Example 9-2 | | | | 5 | Compound B | 1 | 5 | 633 | 76 |
| Example 9-3 | | | | 5 | Compound C | 1 | 5 | 632 | 75 |
| Example 9-4 | | | | 5 | Compound D | 1 | 5 | 630 | 75 |
| Example 9-5 | | | DFEC | 5 | Compound A | 1 | 5 | 634 | 80 |
| Example 9-6 | | | | 5 | Compound B | 1 | 5 | 632 | 80 |
| Example 9-7 | | | | 5 | Compound C | 1 | 5 | 631 | 79 |
| Example 9-8 | | | | 5 | Compound D | 1 | 5 | 630 | 79 |
| Example 9-9 | | | Fluoromethyl methyl carbonate | 5 | Compound A | 1 | 5 | 636 | 74 |
| Example 9-10 | | | | 5 | Compound B | 1 | 5 | 635 | 73 |
| Example 9-11 | | | | 5 | Compound C | 1 | 5 | 633 | 72 |
| Example 9-12 | | | | 5 | Compound D | 1 | 5 | 634 | 72 |
| Example 9-13 | | | Bis(fluoromethyl) carbonate | 5 | Compound A | 1 | 5 | 638 | 76 |
| Example 9-14 | | | | 5 | Compound B | 1 | 5 | 636 | 75 |
| Example 9-15 | | | | 5 | Compound C | 1 | 5 | 635 | 75 |
| Example 9-16 | | | | 5 | Compound D | 1 | 5 | 635 | 75 |
| Comparative Example 9-1 | $LiN_{0.5}Co_{0.2}Mn_{0.3}O_2$ | SnCoC compound | — | — | — | — | — | 254 | 45 |
| Comparative Example 9-2 | | | — | — | Compound A | 1 | — | 262 | 40 |
| Comparative Example 9-3 | | | — | — | Compound B | 1 | — | 262 | 41 |
| Comparative Example 9-4 | | | — | — | Compound C | 1 | — | 261 | 40 |
| Comparative Example 9-5 | | | — | — | Compound D | 1 | — | 263 | 39 |
| Comparative Example 9-6 | | | FEC | 5 | — | — | — | 220 | 75 |
| Comparative Example 9-7 | | | DFEC | 5 | — | — | — | 212 | 78 |
| Comparative Example 9-8 | | | Fluoromethyl methyl carbonate | 5 | — | — | — | 225 | 71 |
| Comparative Example 9-9 | | | Bis(fluoromethyl) carbonate | 5 | — | — | — | 230 | 74 |

Mass ratio: Halogenated carbonate/Alkylbenzene (Evaluation)

As shown in Table 9, in Examples 9-1 to 9-16, the lithium nickel complex oxide with a high nickel content ($LiN_{0.5}Co_{0.2}Mn_{0.3}O_2$) was used as the positive electrode active material. Also, the SnCoC compound was used for the negative electrode. In that case, the electrolytic solution was allowed to contain 5% by mass of the halogenated carbonate represented by any of the formulae (1) to (2) (fluoromethyl methyl carbonate, bis(fluoromethyl) carbonate, FEC or DFEC) and 1% by mass of the alkylbenzene represented by the formula (3) (Compound A, Compound B, Compound C or Compound D). According to this, the generation of a gas was sufficiently suppressed, so that the operating time of safety valve was long. Also, the cycle retention rate was favorable.

On the other hand, in Comparative Examples 9-1 to 9-9, the electrolytic solution contains only either one of the halogenated carbonate represented by any of the formulae (1) to (2) or the alkylbenzene represented by the formula (3), or does not contain the both. In consequence, the generation of a gas was not sufficiently suppressed, so that the operating time of safety valve was short.

Examples 10-1 to 10-16 and Comparative Examples 10-1 to 10-9

The negative electrode 22 was fabricated in the following manner. That is, the negative electrode 22 was fabricated by forming the positive electrode active material layer 22B made of silicon on the both surfaces of the negative electrode collector 22A made of a copper foil (15 μm in thickness) by an electron beam vapor deposition method.

Secondary batteries of Examples 10-1 to 10-16 and Comparative Examples 10-1 to 10-9 were fabricated in the same manners as in Example 1-16, Examples 2-1 to 2-15, Comparative Examples 1-1 to 1-3 and Comparative Examples 2-1 to 2-6, respectively, except for the foregoing point.

With respect to the secondary batteries of Examples 10-1 to 10-16 and Comparative Examples 10-1 to 10-9, the operating time of safety valve and cycle characteristics were determined in the same manner as in Example 1-1. Measurement results are shown in Table 10.

TABLE 10

| | Positive electrode active material | Negative electrode | Halogenated carbonate | Content [% by mass] | Alkyl-benzene | Content [% by mass] | Mass ratio | Operating time of safety valve [h] | Cycle retention rate [%] |
|---|---|---|---|---|---|---|---|---|---|
| Example 10-1 | $LiN_{0.5}Co_{0.2}Mn_{0.3}O_2$ | Si | FEC | 5 | Compound A | 1 | 5 | 607 | 66 |
| Example 10-2 | | | | 5 | Compound B | 1 | 5 | 603 | 66 |
| Example 10-3 | | | | 5 | Compound C | 1 | 5 | 602 | 65 |
| Example 10-4 | | | | 5 | Compound D | 1 | 5 | 600 | 65 |
| Example 10-5 | | | DFEC | 5 | Compound A | 1 | 5 | 601 | 69 |
| Example 10-6 | | | | 5 | Compound B | 1 | 5 | 602 | 68 |
| Example 10-7 | | | | 5 | Compound C | 1 | 5 | 601 | 68 |
| Example 10-8 | | | | 5 | Compound D | 1 | 5 | 600 | 68 |

TABLE 10-continued

|  | Positive electrode active material | Negative electrode | Halogenated carbonate | Content [% by mass] | Alkyl-benzene | Content [% by mass] | Mass ratio | Operating time of safety valve [h] | Cycle retention rate [%] |
|---|---|---|---|---|---|---|---|---|---|
| Example 10-9 |  |  | Fluoromethyl | 5 | Compound A | 1 | 5 | 605 | 56 |
| Example 10-10 |  |  | methyl carbonate | 5 | Compound B | 1 | 5 | 605 | 56 |
| Example 10-11 |  |  |  | 5 | Compound C | 1 | 5 | 603 | 55 |
| Example 10-12 |  |  |  | 5 | Compound D | 1 | 5 | 604 | 55 |
| Example 10-13 |  |  | Bis(fluoromethyl) | 5 | Compound A | 1 | 5 | 607 | 62 |
| Example 10-14 |  |  | carbonate | 5 | Compound B | 1 | 5 | 608 | 61 |
| Example 10-15 |  |  |  | 5 | Compound C | 1 | 5 | 605 | 61 |
| Example 10-16 |  |  |  | 5 | Compound D | 1 | 5 | 605 | 61 |
| Comparative Example 10-1 | $LiN_{0.5}Co_{0.2}Mn_{0.3}O_2$ | Si | — | — | — | — | — | 204 | 25 |
| Comparative Example 10-2 |  |  | — | — | Compound A | 1 | — | 208 | 20 |
| Comparative Example 10-3 |  |  | — | — | Compound B | 1 | — | 215 | 21 |
| Comparative Example 10-4 |  |  | — | — | Compound C | 1 | — | 212 | 20 |
| Comparative Example 10-5 |  |  | — | — | Compound D | 1 | — | 209 | 29 |
| Comparative Example 10-6 |  |  | FEC | 5 | — | — | — | 185 | 65 |
| Comparative Example 10-7 |  |  | DFEC | 5 | — | — | — | 180 | 68 |
| Comparative Example 10-8 |  |  | Fluoromethyl methyl carbonate | 5 | — | — | — | 176 | 55 |
| Comparative Example 10-9 |  |  | Bis(fluoromethyl) carbonate | 5 | — | — | — | 175 | 61 |

Mass ratio: Halogenated carbonate/Alkylbenzene (Evaluation)

As shown in Table 10, in Examples 10-1 to 10-16, the lithium nickel complex oxide with a high nickel content ($LiNi_{0.5}Co_{0.2}Mn_{0.3}O_2$) was used as the positive electrode active material. Also, silicon was used for the negative electrode. In that case, the electrolytic solution was allowed to contain 5% by mass of the halogenated carbonate represented by any of the formulae (1) to (2) (fluoromethyl methyl carbonate, bis(fluoromethyl) carbonate, FEC or DFEC) and 1% by mass of the alkylbenzene represented by the formula (3) (Compound A, Compound B, Compound C or Compound D). According to this, the generation of a gas was sufficiently suppressed, so that the operating time of safety valve was long. Also, the cycle retention rate was favorable.

On the other hand, in Comparative Examples 10-1 to 10-9, the electrolytic solution contains only either one of the halogenated carbonate represented by any of the formulae (1) to (2) or the alkylbenzene represented by the formula (3), or does not contain the both. In consequence, the generation of a gas was not sufficiently suppressed, so that the operating time of safety valve was short.

4. Other Embodiment

It should not be construed that the present application is limited to the foregoing embodiments, various modifications and applications can be made herein so far as the gist of the present application is not deviated. For example, it should not be construed that the present application is limited to the foregoing embodiments, various modifications and applications can be made herein so far as the gist of the present application is not deviated. For example, while the secondary batteries of a cylinder type and a flat type (laminate type) have been described as examples in the first to third embodiments, the present application can be similarly applied to secondary batteries of a rectangular type, a button type, a thin type, a large-sized type and a laminate type.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A nonaqueous electrolyte battery comprising:
   a positive electrode,
   a negative electrode, and
   a nonaqueous electrolyte, wherein
   the positive electrode contains, as a positive electrode active material, a positive electrode material having a surface composition represented by the following formula (I);
   the nonaqueous electrolyte contains a halogenated carbonate represented by any of the following formulae (1) to (2) and an alkylbenzene, wherein the alkylbenzene is one or more of tert-pentylbenzene, 1,2-diethylpropylbenzene and 2,2-diphenylpropane;
   a content of the halogenated carbonate is 0.1% by mass or more and not more than 50% by mass relative to the nonaqueous electrolyte; and
   a content of the alkylbenzene is 0.1% by mass or more and not more than 5% by mass relative to the nonaqueous electrolyte $$Li_pNi_{(1-q-r)}M1_qM2_rO_{(2-y)}X_z \qquad (I)$$

wherein
   each of M1 and M2 represents at least one member selected from the group consisting of elements of the groups 2 to 15 other than nickel (Ni); X represents at least one member selected from the group consisting of elements of the groups 16 and 17 other than oxygen (O); p, q, r, y and z are values falling within the ranges of $(0 \le p \le 1.5)$, $(0 \le q \le 1.0)$, $(0 \le r \le 1.0)$, $(-0.10 \le y \le 0.20)$ and $(0 \le z \le 0.2)$, respectively; and (q+r) is less than 1,

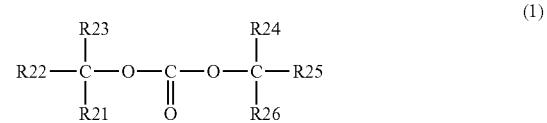

(1)

wherein
each of R21 to R26 independently represents a hydrogen group, a halogen group, an alkyl group or a halogenated alkyl group, provided that at least one of R21 to R26 is a halogen group or a halogenated alkyl group,

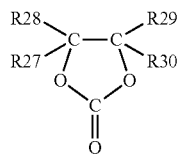

(2)

wherein
each of R27 to R30 independently represents a hydrogen group, a halogen group, an alkyl group or a halogenated alkyl group, provided that at least one of R27 to R30 is a halogen group or a halogenated alkyl group.

2. The nonaqueous electrolyte battery according to claim 1, wherein
the positive electrode material has a surface composition with a high nickel content, represented by the formula (I) wherein (q+r) is not more than 0.5.

3. The nonaqueous electrolyte battery according to claim 1, wherein
a mass ratio of the halogenated ester to the alkylbenzene (halogenated ester/alkylbenzene) is 0.1 or more and not more than 200.

4. The nonaqueous electrolyte battery according to claim 1, wherein
the halogenated carbonate is at least one member selected from the group consisting of fluoromethyl methyl carbonate, bis(fluoromethyl) carbonate, 4-fluoro-1,3-dioxolan-2-one and 4,5-difluoro-1,3-dioxolan-2-one.

5. The nonaqueous electrolyte battery according to claim 1, wherein
the positive electrode material is a lithium nickel complex oxide having the composition represented by the formula (I).

6. The nonaqueous electrolyte battery according to claim 5, wherein
the lithium nickel complex oxide is a lithium nickel complex oxide with a high nickel content, represented by the formula (I) wherein (q+r) is not more than 0.5.

7. The nonaqueous electrolyte battery according to claim 6, wherein
the positive electrode contains, as the positive electrode active material, other lithium complex oxide, in addition to the lithium nickel complex oxide with a high nickel content, and
a content of the lithium nickel complex oxide with a high nickel content is 50% by mass or more relative to a total mass of the positive electrode active material.

8. The nonaqueous electrolyte battery according to claim 7, wherein
the other lithium complex oxide is at least one member selected from the group consisting of lithium cobaltate; a cobalt based lithium complex oxide containing a metal element other than cobalt disposed in place of at least a part of cobalt in lithium cobaltate; and a lithium manganese complex oxide having a spinel type structure.

9. The nonaqueous electrolyte battery according to claim 1, wherein
the positive electrode material has
a lithium complex oxide particle, and
a coating layer provided in at least a part of the surface of the lithium complex oxide particle; and
the coating layer contains an oxide having lithium, nickel and manganese.

10. The nonaqueous electrolyte battery according to claim 9, wherein
a composition ratio of nickel to manganese in the coating layer falls within the range of 95/5 to 20/80.

11. The nonaqueous electrolyte battery according to claim 9, wherein
an amount of the coating layer is 2% by mass or more and not more than 30% by mass relative to the lithium complex oxide particle.

* * * * *